FIG. 1
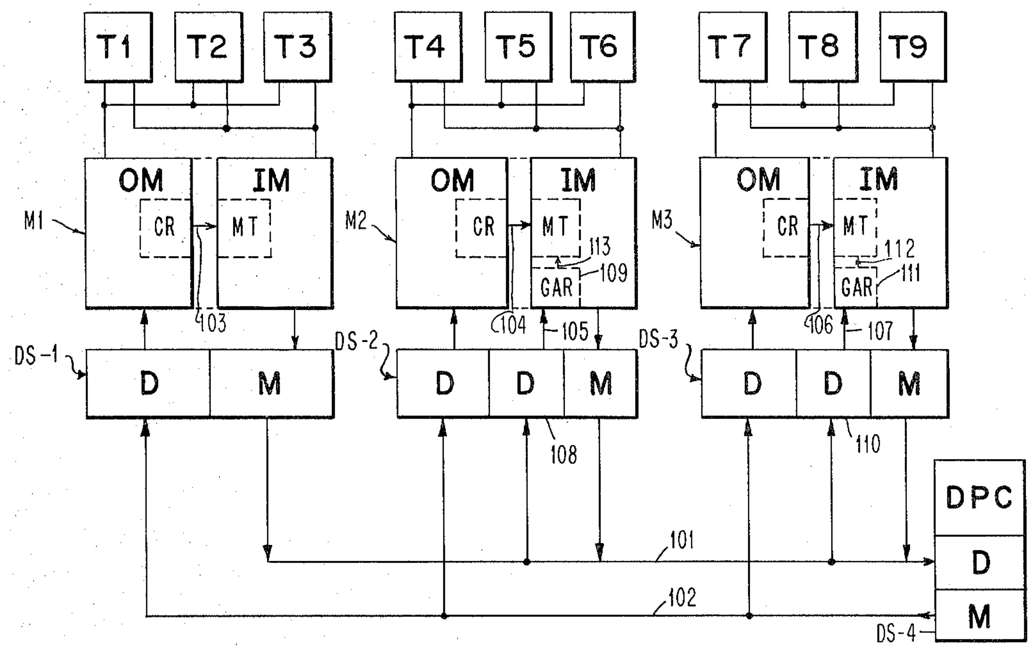
FIG. 2 OUTPUT MULCOM LOGIC
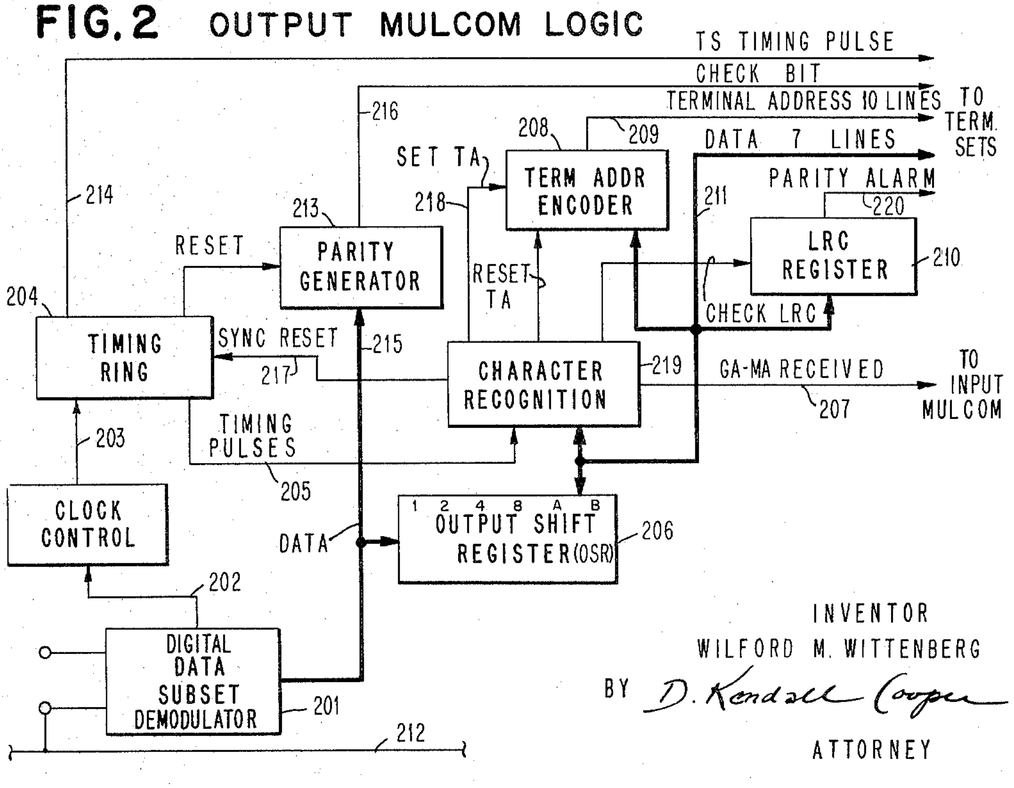
INVENTOR
WILFORD M. WITTENBERG
BY D. Kendall Cooper
ATTORNEY

OUTPUT MULCOM - GO AHEAD, THIS MULCOM

INPUT MULCOM TIMING PULSES

FIG. 8
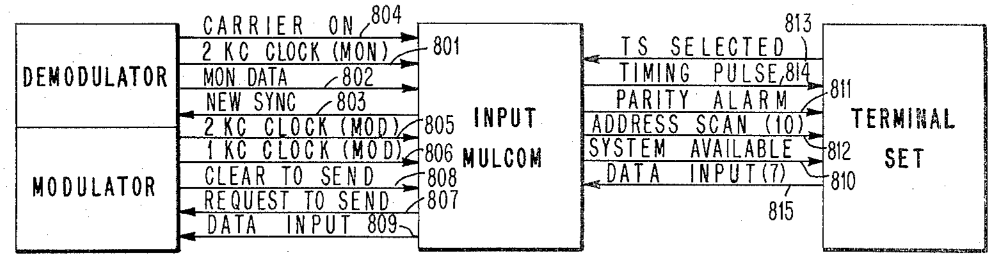
GO AHEAD RECOGNITION (GAR) FIG. 10
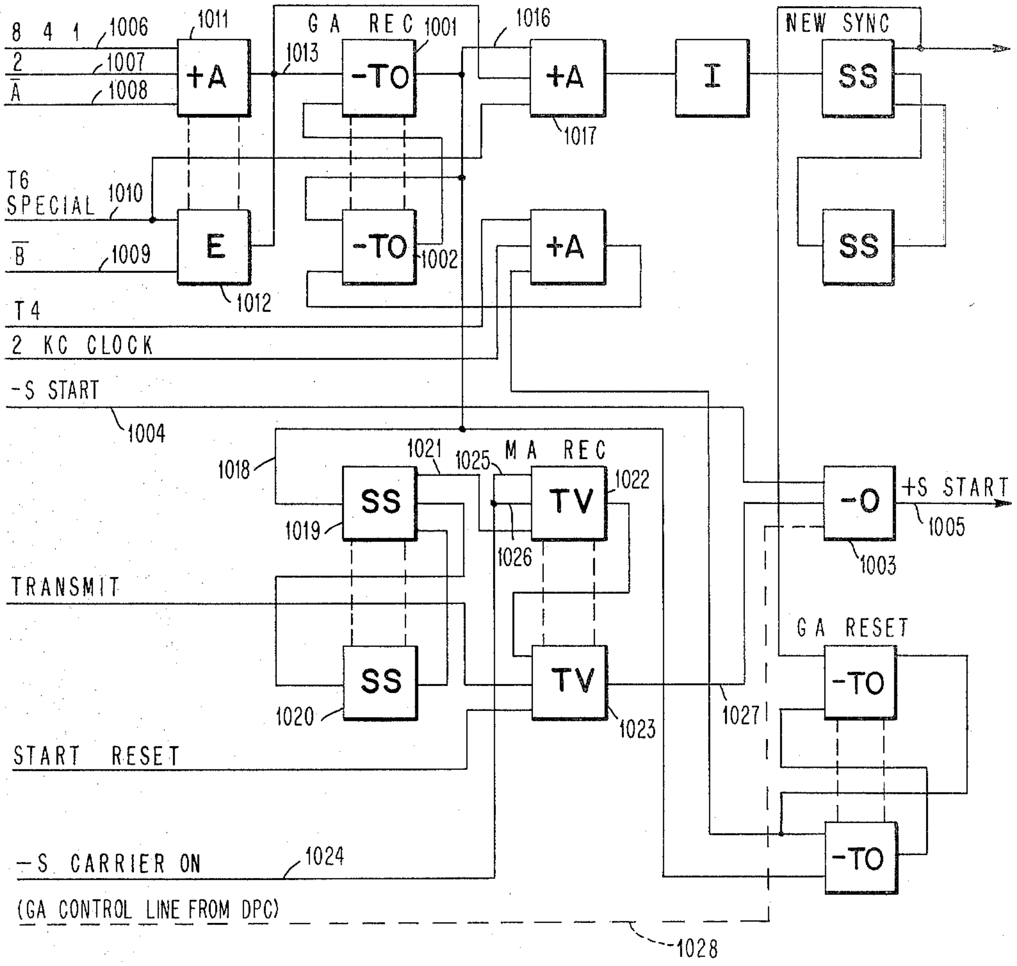

INPUT MULCOM - MONITOR AND TRANSMIT

2 INPUT LOGIC BLOCK

3 INPUT LOGIC BLOCK

SINGLE SHOT (SS)

SYNC RECOGNITION

OUTPUT TIMING

April 5, 1966 W. M. WITTENBERG 3,244,804
TIME DELAY CONTROLLED REMOTE STATION TRANSMISSION TO CENTRAL DATA COLLECTING STATION
Filed June 28, 1961 17 Sheets-Sheet 12

INPUT CONTROL

INPUT MESSAGE ASSEMBLY

FIG. 22 MESSAGE FORMAT GENERATOR

DRIVER, EMITTER FOLLOWER (DE)

R TO S CONVERTER (C)

POWER DRIVER (DP)

GATED SAMPLE PULSE DRIVER (DSP)

3,244,804

TIME DELAY CONTROLLED REMOTE STATION TRANSMISSION TO CENTRAL DATA COLLECTING STATION

Wilford M. Wittenberg, Poughkeepsie, N.Y., assignor to International Business Machines Corporation, New York, N.Y., a corporation of New York Filed June 28, 1961, Ser. No. 120,385
2 Claims. (Cl. 178—3)

This invention relates to communications systems, and more particularly to address techniques for communications systems.

Telegraphic, telephonic, and radio communications systems with remotely interconnected or controlled stations and exchanges have been used extensively for data communications, telemetering and person to person or station to station transfer of information. Specialized addressing equipment has been designed and has performed its functions satisfactorily within the intended environment.

In the past decade, there has been a tendency to broaden the usefulness of communication systems by developing real-time data processing systems in order to meet the ever increasing demands and complexities of modern business and scientific endeavors. Systems of this nature generally have a multitude of remote terminal stations which are interconnected with a centrally located data processing system or control center.

In the real-time applications, problem factors or inquiries are entered at the remote stations, and transmitted to the data processing center for appropriate computation. Replies are generated by the data processing center and transmitted to the remote stations. A complete transaction, involving an inquiry and a reply, is usually completed in a fraction of a second.

The communication lines and equipment generally operate in millisecond time intervals, while the data processing system, being much faster, operates on the basis of microsecond intervals. Because of this differential in time, data processing system need not direct all of its activities to the intercommunication (real-time) activities. Since the data processing center is usually of a general purpose nature, it can be used for solving other matters not related to the real-time aspects of the system. These matters may include the preparation of reports of a general business or accounting nature, statistical reports, file maintenance and other non-real-time applications.

In this manner, the data processing center is capable of handling, in their entirety, a wide range of requirements for a particular business.

Because of the dual nature of a system of this kind, it is desirable to free to data processing center from as many of the intercommunication control functions of the system as possible.

This invention is concerned with relieving the data processing center of a major portion of the addressing functions normally encountered in a communications network.

In the prior art, the addressing functions of a particular system have been more or less concentrated at a control center or central exchange in order to maintain closer supervision and control of the system. Addressing of remote stations in order to notify them to transmit messages has been primarily under control of the central station or exchange. In many instances, additional time has been required at the central station for receipt of an answer-back signal from any addressed station, for acknowledgement purposes. Prior art addressing techniques of this kind require that a considerable amount of the available operating time of the center be devoted to the addressing activities.

This invention is predicated on the concept that any central station time saved by a reduction in addressing activities can be used to advantage in other processing activities.

Accordingly, an object of the invention is to provide an addressing technique for a multi-station communication system which results in a considerable savings in time for the central station.

Another object of the invention is to provide a communications system addressing technique which is straightforward and free of the complexities of prior art addressing techniques.

A further object of the invention is to provide an addressing scheme which insures that each of a number of stations is given the opportunity to gain access to a common line without interference, one among the other.

Another object of the invention is to provide a communication network in which demands on the central station's time are minimized, but in which control of the network is retained in reserve by the central station.

It is another object of the invention to provide a communication addressing scheme which inherently and automatically continues to function, even though portions of the communications network may become inoperative.

Another object of the invention is to provide a communication addressing technique which is equally effective with a few remote stations as with a great many remote stations.

A still further object of the invention is to provide a communication system in which the direct and positive addressing techniques of the prior art are minimized and in which an indirect addressing technique is predominant.

Another object of the invention is to provide a time multiplexing addressing technique which may be effectively employed at any information transfer level within a communication system, and which has universal application.

Still another object of the invention is to provide a communication network in which addressing is effected by digital code permutation signals in conjunction with analog signals.

An additional object of the invention is to provide a system in which digital signals are used during certain portions of the addressing sequence, while analog signals are used during other portions of the addressing sequence, thus combining the advantages of both types of signals.

Another object of the invention is to provide a system in which the addressing functions can be initiated entirely with analog signals.

In order to accomplish these and other objects, there has been provided in accordance with the present invention, a communication system which includes a central station interconnected with a plurality of remote stations, wherein addressing sequences for establishing line time for each remote station are initiated by the central station and are subsequently continued by said remote stations without control or intervention of the central station, under normal circumstances. In accordance with the invention, a go-ahead signal sent by the central processing unit and accompanied by an appropriate address is recognized as a signal to commence transmitting by the unit to which the address relates. At the end of transmission, a go-ahead signal is sent out by the addressed unit; the go-ahead signal starts a time-out in each subsequent unit, and the unit having the lowest time-out following the receipt of the go-ahead message will commence transmitting; units with longer time-outs are prevented from transmitting by the presence of a transmitted carrier from the unit having the lowest time-out.

A related, but distinct invention of the same assignee is found in U.S. patent application Serial No. 120,771, entitled "Counter Controlled Addressing System," filed on June 29, 1961, by George J. Evans, Jr. In said related invention, the turn in the sequence of each unit is recognized by counting the number of units which have transmitted until the appropriate count is reached.

This invention includes the ability of the central station to select any unit for transmission, notwithstanding the polling sequence, by sending a go-ahead message with an appropriate address.

The foregoing and other objects, features and advantages of the invention will be apparent from the following more particular description of the preferred embodiments of the invention, as illustrated in the accompanying drawings.

In the drawings:

FIG. 1 represents a communication system in which the invention is incorporated.

FIG. 2 is a more detailed representation of the output portion of a multiplexing unit depicted in FIG. 1.

FIG. 8 represents interconnections among certain other equipment in FIG. 1.

FIG. 10 is an address recognition circuit which has particular usefulness in the practice of the invention including several segments of the equipment shown in FIG. 6.

FIGS. 11–15 are basic circuit blocks which are used in the invention.

Figure 19:
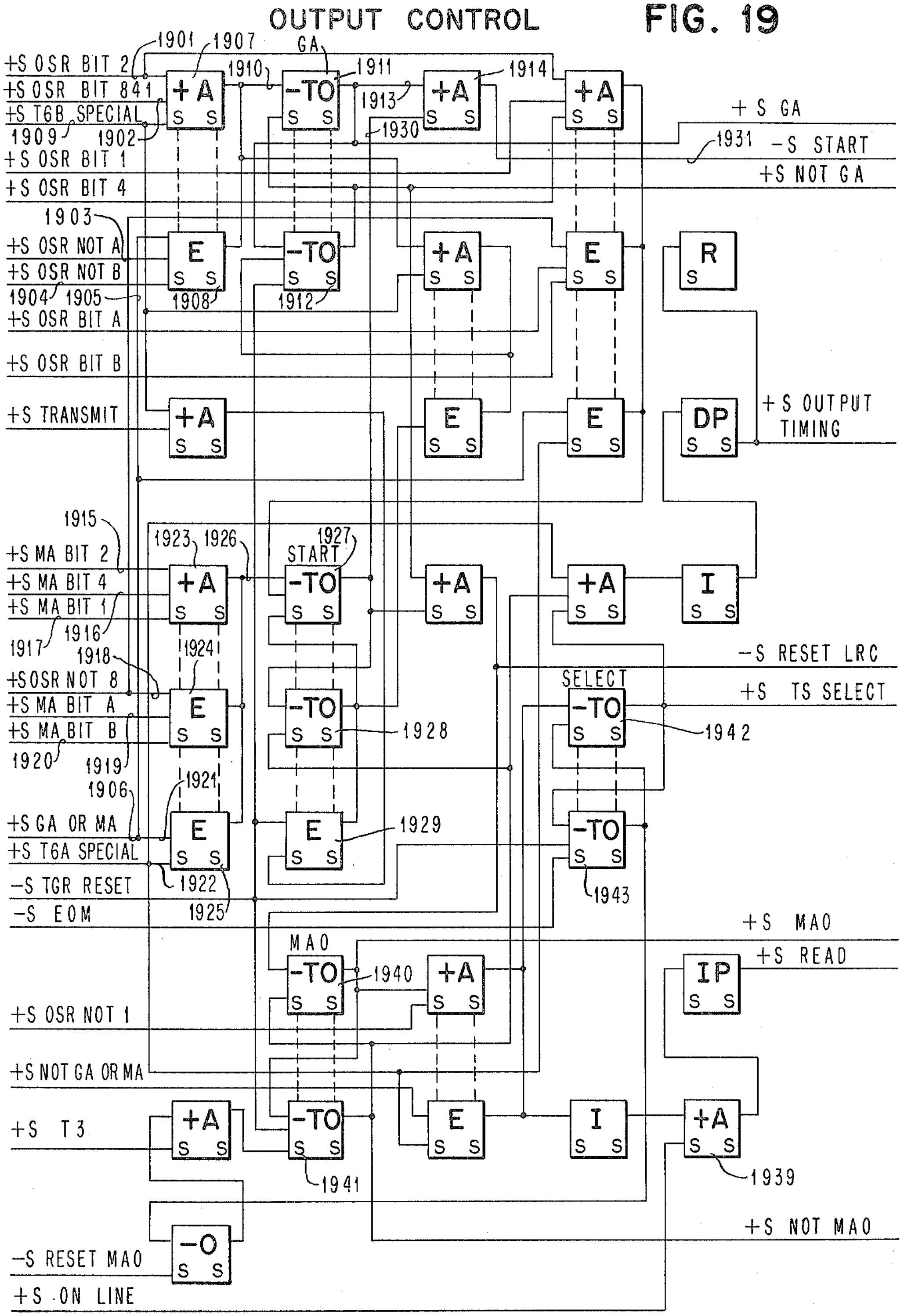
FIG. 19 is a control circuit in the equipment of FIG. 2.

The following description covers a communication system, within which the present invention may be utilized. The heart of the invention, as illustrated primarily in FIG. 10 (description begins in the section entitled "Go Ahead Message Mulcom to Mulcom"), relates to the ability of the various remote units to control scanning of themselves so as to permit them to initiate message transmission in an orderly polling or calling sequence. This is achieved by means of "go-ahead" signals which each unit can transmit at the end of its message transmission. Each unit monitors the transmission line and sets a trigger when a "go-ahead" is sensed. After a delay in time, which is determined by a single-shot circuit, each unit will test the line to see if any other unit has begun transmission: if no carrier signal is present on the line, the unit will generate a start signal which will permit that same unit to transmit. The time delay in each unit differs from that of any other unit so that the unit which is first in the sequence has a short time, and the unit which is later in the sequence has a correspondingly greater time. Thus, the unit with a shorter time will begin transmitting before the time-out of the delay for any unit subsequent in the sequence; this transmission will block all subsequent units from entering the transmit mode. The invention includes the ability to transmit as a result of the above-described polling, or in response to an addressed go-ahead sent to a unit by a central station as shown in FIG. 19 (−S START). No low-ordered unit (2, 3) can be called into action by a go-ahead from a higher unit (5, 6) because the transmission lines 101, 102 are unidirectional; the signals are propagated along the lines through amplifiers; thus, the input line 101 transfers the signals from M1 to M2—to M3 . . . to DPC, and not vice versa.

The specification includes a description of closely related portions of a communication unit, including input and output portions, capable of practicing the present invention; the system is broadly described, and then the output portion of a unit, including addressed go-ahead message recognition, is described in detail; following that, the self-polled input unit is given detailed treatment.

In the drawings, the exact name given to each signal line is consistent and unique throughout the drawings; however, in order to assist in locating items in the drawings, the high-order digits of reference numerals comprise the figure number of the figure where the item is shown in context with the description.

The following charts indicate the relationship of hardware shown in more than one figure.

FIG. 1

OM=FIG. 2
CR=219
104, 106=207; 1931; 1004
108, 110=606
109, 111=FIG. 10; 611
MT=625, 626, 627, 628, 644

101=613
102=212
105, 107=801, 802, 803, 804
112, 113=(goes from 611 to 626); 1027

FIG. 2

Figure 16:
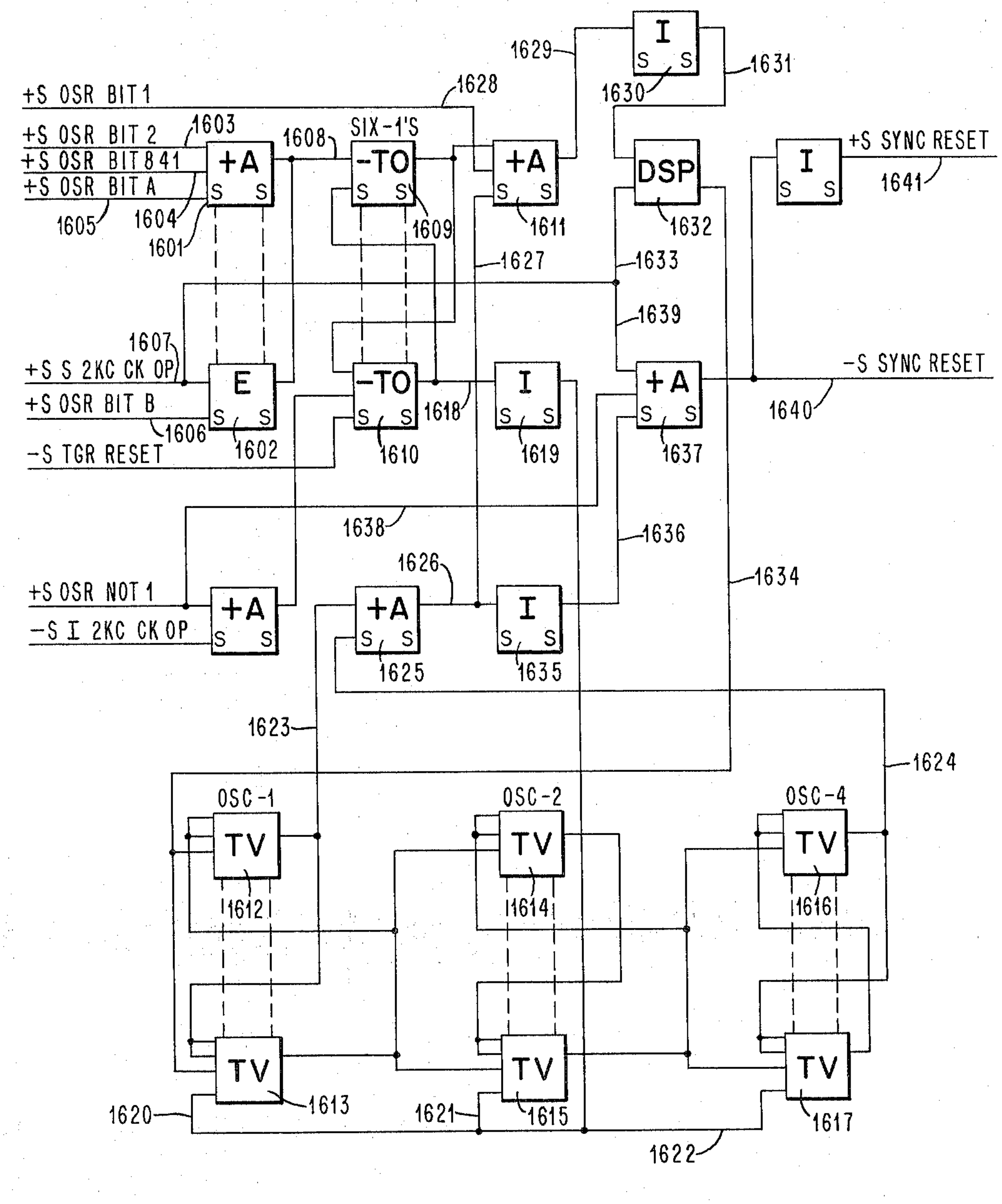
FIG. 16 is a synchronization recognition circuit provided in the output multiplexing equipment of FIG. 2.
Figure 17:
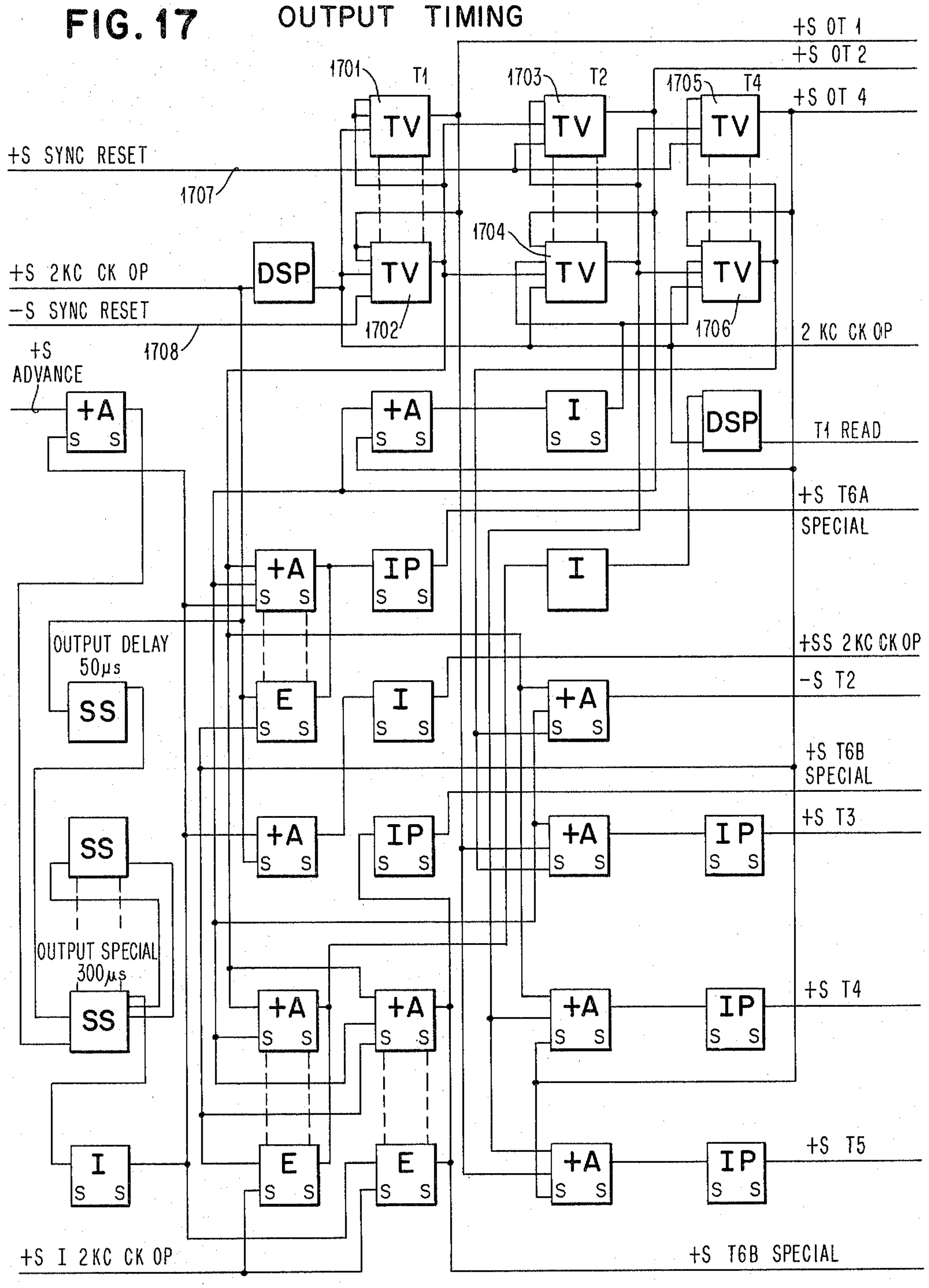
FIG. 17 is a timing circuit in the equipment of FIG. 2.

204=FIG. 17
219=FIG. 16, FIG. 18, FIG. 19
215=402
202=401, 403
211, 216=405
209=406

214=404
220=407
217=1803; 1640, 1641
212=102
207=−S START (FIG. 6), 1004, 1931

FIG. 6

611 and 626=FIG. 10
625=2034, 2035
644=2046, 2048, 2049
612=2004
647=2033

Figure 21:
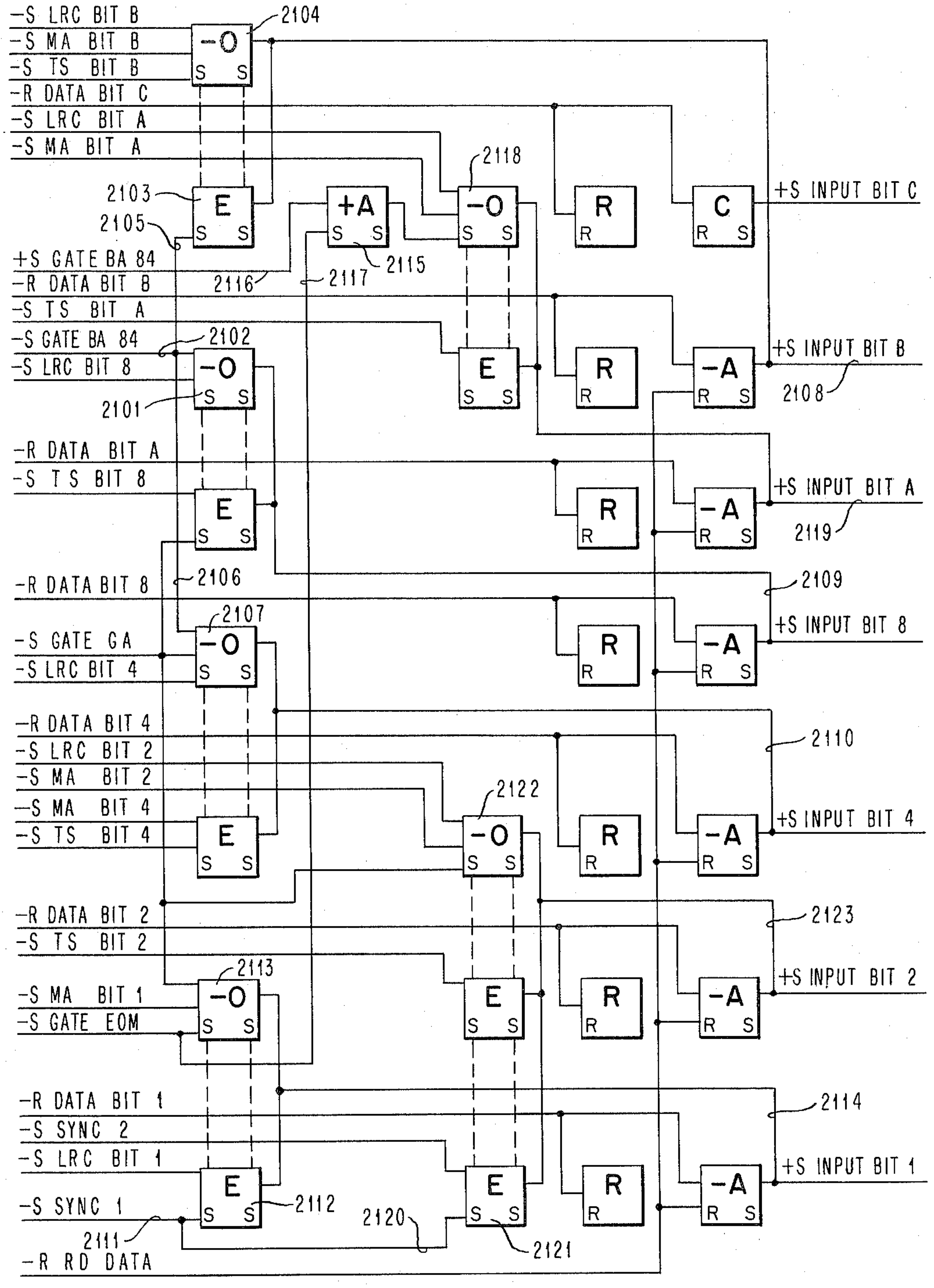
FIG. 21 is a message assembly circuit in the equipment of FIG. 6.
Figure 22:
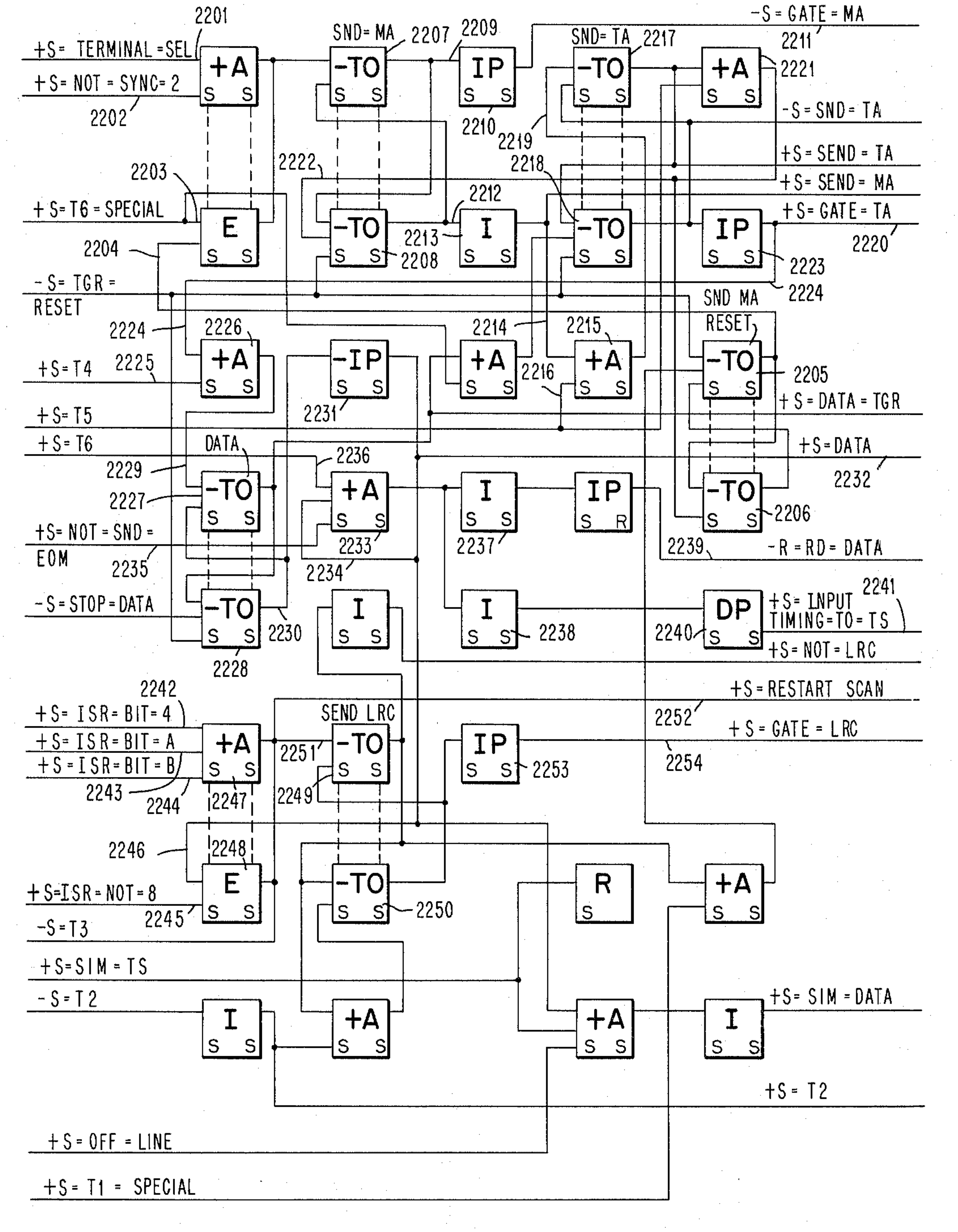
FIG. 22 is a message format circuit in the equipment of FIG. 6.

615=FIG. 21
620 and 623=FIG. 22
645=2252
617=2032

FIG 10 INPUTS

| Line Name | Ref No. | Comes from FIG. No. | Ref. No. or Name |
|---|---|---|---|
| 841 | 1006 | 6 | 606. |
| 2 | 1007 | 6 | 606. |
| $\overline{A}$ | 1008 | 6 | 606. |
| T6 Special | 1010 | 6 | Timing. |
| $\overline{B}$ | 1009 | 6 | 606. |
| T4 | ---- | 17 | +S T4. |
| 2 KC Clock | ---- | 8 | 801. |
| −S Start | 1004 | 19 | 1931. |
| Transmit | ---- | 20 | −S XMIT. |
| Start Reset | ---- | 20 | +S Reset. |
| −S Carrier ON | 1024 | 8 | 804. |
| GA Control Line From DPC. | 1028 | (1) | From DPC if desired. |

[1] Optional, to any unit.

FIG. 10 OUTPUTS

| Line Name | Ref. No. | Goes to FIG. No. | Ref. No. |
|---|---|---|---|
| New SYNC | | 8 | 803 |
| +S Start | 1005 | 20 | 2001 |

FIG. 16 INPUTS

| Line Name | Ref. No. | Comes from FIG. No. | Ref. No. or Name |
|---|---|---|---|
| OSR Bits | | 2 | 206. |
| +SS 2KC CK OP | 1607 | 17 | +SS 2 KC CK OP. |
| −S TGR Reset | | 2 | 204. |
| −S I 2KC CK OP | | 4 | 401. |

FIG. 16 OUTPUTS

| Line Name | Ref. No. | Gose to FIG. No. | Ref. No. |
|---|---|---|---|
| +S SYNC Reset | 1641 | 17 | 1707 |
| −S SYNC Reset | 1640 | 17, 18 | 1708, 1803 |

FIG. 17 INPUTS

| Line Name | Ref. No. | Comes from FIG. No. | Ref. No. |
|---|---|---|---|
| +S SYNC Reset | 1707 | 16 | 1641 |
| +S 2KC CK OP | | 4 | 401 |
| −S SYNC Reset | 1708 | 16 | 1640 |
| +S Advance | | 2 | 204 |
| +S I 2KC CK OP | | 4 | 401 |

FIG. 17 OUTPUTS

| Line Name | Ref. No. | Goes to FIG. No. | Ref. No. or Name |
|---|---|---|---|
| +S OT 1, 2, 4 | | 17 (only) | |
| 2 KC CK OP | | 4 | 401. |
| T1 Read | | 6 | 601. |
| +S T6A Special | | 18 | +S TGA Special. |
| +SS 2KC CK OP | | 16 | 1607. |
| −S T2 | | 22 | |
| +S T6B Special | | 19 | 1909. |
| +S T3 | | 18, 19 | |
| +S T4 | | 18, 20, 22, 10 | |
| +S T5 | | 18, 22 | |
| −S T6B Special | | 17 | +S T6B Special. |
| T6 SPEC | | 10, 22, 20 | |

FIG. 18 INPUTS

| Line Name | Ref. No. | Comes from FIG. No. | Ref. No. or Name |
|---|---|---|---|
| +OSR Bits | | 2 | 206. |
| +S TGA Special | | 17 | +S T6A Special. |
| +S T3, T4, T5 | 1804 | 17 | +S T3, T4, T5. |
| −S TGR Reset | | 2 | 204. |
| +S Not GA | | 19 | +S Not GA. |
| +S Not MAO | | 19 | +S Not MAO. |
| −S SYNC Reset | 1803 | 16 | 1640. |

FIG. 18 OUTPUTS

| Line Name | Ref. No. | Goes to FIG. No. | Ref. No. |
|---|---|---|---|
| +S EOM | | 2 | 208 |
| +S Check LRC | | 2 | 208 |
| −S EOM | | 2 | 208 |
| −S Reset LGA | | 2 | 208 |
| −S Set LRC | | 2 | 208 |
| +S GA OR MA TGR | | 18 (only) | |
| +S GA OR MA | 1813 | 19 | 1906 |
| +S Not GA OR MA | 1811 | 19 | |
| +S SYNC | | 2 | 204 |

FIG. 19 INPUTS

| Line Name | Ref. No. | Comes from FIG. No. | Ref. No. or Name |
|---|---|---|---|
| +S OSR Bits | | 2 | 206. |
| +S T6B Special | 1909 | 17 | +S T6B Special. |
| +S Transmit | | 20 | 2008 (+S REQ to Transmit/Send). |
| +S MA Bits | (Mulcom Address) | 2 | 206. |
| +S GA OR MA | 1906 | 18 | 1813. |
| +S Not GA OR MA | | 18 | 1811. |
| +S T3 | | 17 | +S T3. |
| −S Reset MAO | | 2 | 204. |
| +S ON Line | | (Operator switch) | |

FIG. 19 OUTPUTS

| Line Name | Ref. No. | Goes to FIG. No. | Ref. No. or Name |
|---|---|---|---|
| +S GA | 1913 | | |
| −S Start | 1931 | 10 | |
| +S Not GA | | 18 | |
| +S Output Timing | | 4 | 404. |
| −S Reset LRC | | 2 | 210. |
| +S TS Select | | 2 | 208. |
| +S MAO | | | |
| +S Read | | | |
| +S Not MAO | | 18 | +S Not MAO. |

FIG. 20 INPUTS

| Line Name | Ref. No. | Comes from FIG. No. | Ref. No. or Name |
|---|---|---|---|
| +S Start | 2001 | 10 | 1005. |
| +S 1 KC CK | | 4 | 403. |
| −S OFF Line Start | | 6 | Clock Control. |
| AC TGR Reset | | 6 | |
| +S ON Line | | 6 | |
| −S GO | | 6 | |
| −S Clear to Send | 2005 | 8 | 808. |
| +S T4 | | 17 | +S T4. |
| −S Gate EOM | | 6 | 620. |
| +S T6 Special | | 6 | Timing. |
| +S End Scan | 2033 | 6, 8 | 618, 619; 813. |
| +S Not LRC | 2039 | 22 | +S Not LRC. |
| −S TGR Reset | | 6 | Timing. |
| +S T5 IP | 2043 | 6 | |
| +S T1 Special | | 6 | |
| +S T1 | | 6 | |

FIG. 20 OUTPUTS

| Line Name | Ref. No. | Goes to FIG. No. | Ref. No. |
|---|---|---|---|
| +S REQ to Transmit/Send | 2004 | 8 | 807 |
| +S MON Mode | | 6 | 601 |
| +S Not MON Mode | | 6 | 601 |
| −S XMIT | | 6 | 629 |
| +S SYNC 2 | 2029 | 6 | 615 |
| +S Start Scan | 2032 | 6 | 634 |
| +S REQ to Send | | 8 | 807 |
| +S Reset | | 6 | 604 |
| −S Gate BA 84 | 2023 | 21 | 2102 |
| −S SYNC 1 | | 21 | 2020 |
| +S Gate BA 84 | 2025 | 21 | 2116 |
| +S Clear to Send | 2014 | 8 | 808 |
| +S Not SYNC 2 | 2054 | 22 | |
| −S SYNC 2 | 2028 | 21 | 2028 |
| +S SYNC 1 | 2018 | 21 | |
| +S Send GA | 2036 | 6 | 628 |
| −S Gate GA | 2040 | 21 | |

FIG. 21 INPUTS

| Line Name | Ref. No. | Comes from FIG. No. | Ref. No. |
|---|---|---|---|
| −S LRC Bits | | 6 | 603 |
| −S MA Bits | | 2 | 219 |
| −S TS Bits | | 6 | 602 |
| −R Data Bits | | 6, 8 | 643, 815 |
| +S Gate BA 84 | 2116 | 20 | 2025 |
| −S Gate BA 84 | 2102 | 20 | 2023 |
| −S Gate GA | | 20 | 2040 |
| −S Gate EOM | 2117 | 6 | 620 |
| −S SYNC 2 | | 20 | 2028 |
| −S SYNC 1 | | 20 | 2020 |

FIG. 21 OUTPUTS

| Line Name | Ref. No. | Goes to FIG. No. | Ref. No. |
|---|---|---|---|
| +S Input Bits | ---- | 6, 8 | 601, 809 |

FIG. 22 INPUTS

| Line Name | Ref. No. | Comes from FIG. No. | Ref. No. or Name |
|---|---|---|---|
| +S Terminal SEL | 2201 | 6 | Timing. |
| +S Not SYNC 2 | 2202 | 20 | 2054. |
| +S T6 Special | 2203 | 6 | Timing. |
| −S TGR Reset | ---- | 6 | Do. |
| +S T4, T5, T6 | 2225, 2217, 2236 | 17 | +S T4, T5, T6. |
| +S Not SND EOM | 2235 | 6 | 646. |
| −S Stop Data | ---- | Operator switch | |
| +S ISR Bits | ---- | 6 | 601. |
| −S T2, T3 | 22 | 17 | −S T2, T3. |
| +S SIM TS | ---- | Operator switch | |
| +S OFF Line | ---- | Operator switch | |
| +S T1 Special | ---- | 6 | Timing. |

FIG. 22 OUTPUTS

| Line Name | Ref. No. | Goes to FIG. No. | Ref. No. |
|---|---|---|---|
| −S Gate MA | 2211 | 6 | 615 |
| −S SND TA | ---- | 6 | 615 |
| +S Send TA | ---- | 6 | 615 |
| +S Send MA | 2214 | 6 | 615 |
| +S Gate TA | 2220 | 6 | 615 |
| +S Data TGR | ---- | 6 | 615 |
| +S Data | 2232 | 6 | 615 |
| −R RD Data | 2239 | 6 | 635 |
| +S Input Timing TO TS | 2241 | 8 | 814 |
| +S Not LRC | ---- | 20 | 2039 |
| +S Restart Scan | 2252 | 6 | 634 |
| +S Gate LRC | 2254 | 6 | 615 |
| +S SIM Data | ---- | 6 | 615 |
| +S T2 | ---- | ---- | ---- |

GENERAL DESCRIPTION

Figure 29:
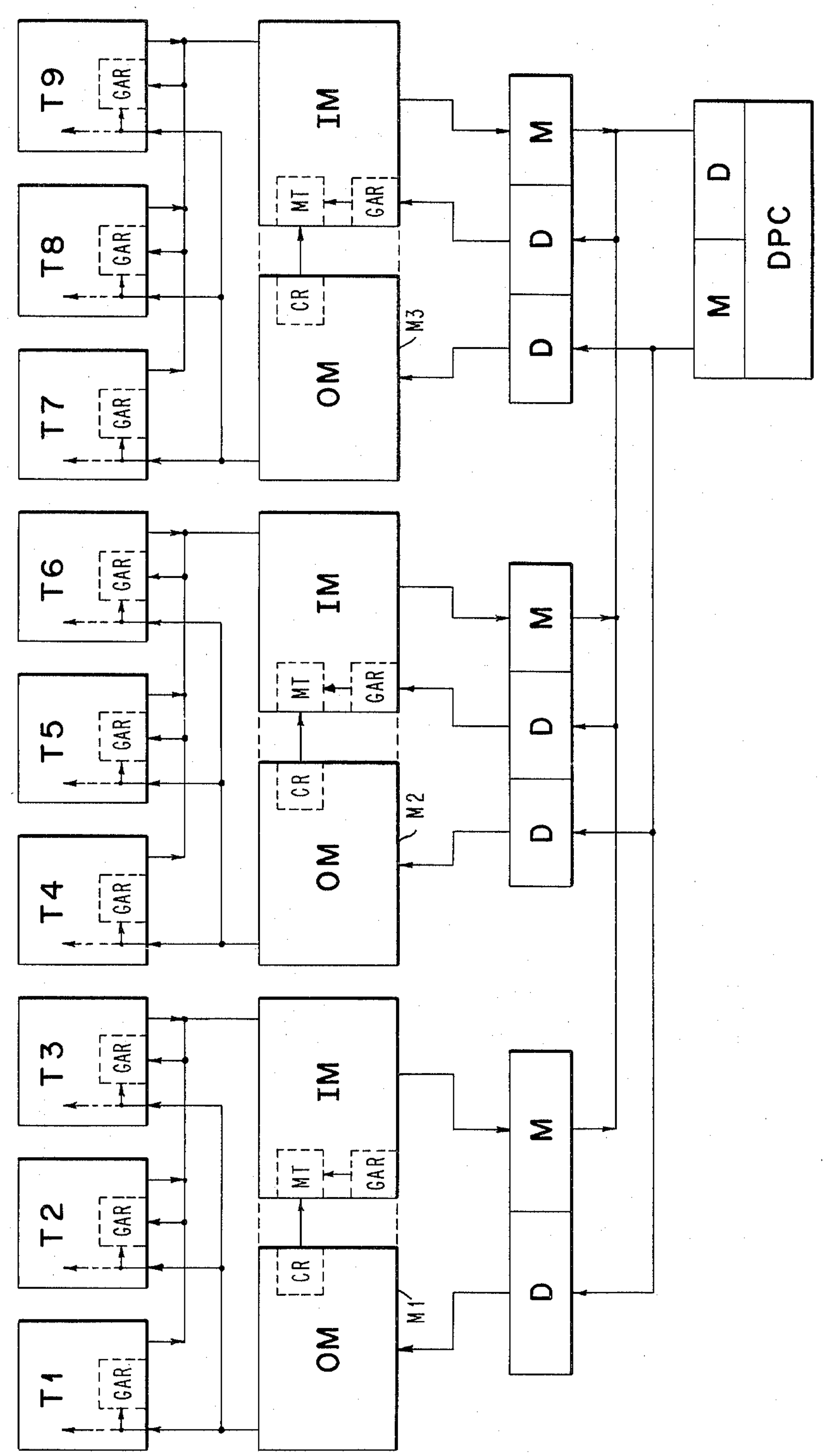
FIG. 29 is an alternative embodiment of the invention, merely illustrating that the invention herein may be utilized in the terminals as well as in the multiplexing communication control units.

An exemplary embodiment of the invention is shown in FIG. 1, and an alternative embodiment is shown in FIG. 29. The system of FIG. 1 includes a Data Processing Center DPC which is interconnected by duplex telephone lines 101 and 102 to a number of remotely located terminals T1–T9 through multiplexing and communication units. These units will be referred to hereinafter as "Mulcoms." In FIG. 1, they are designated as M1, M2 and M3. Each Mulcom M1–M3 has a Digital Subset (DS) associated with it, and each subset has modulation (M) and demodulation (D) sections. The Data Processing Center DPC has similar modulating and demodulating subset equipment.

In the embodiment of FIG. 1, inquiries or messages are generated at the terminal equipments T1–T9 for processing by the Data Processing Center. These are called input messages and are transferred to the DPC over line 101. Replies from the Data Processing Center to specific inquiries as well as unsolicited information are transferred from the center to the individual terminals T1–T9 over the line 102. Signals on line 102 propagate toward the DPC only, and not toward M2.

The messages in the system would, in a typical case, include data characters, as well as selected ones of a number of control characters as shown in Table I hereinafter. Numbered among the control characters are synchronizing characters, identifying characters, and End of Message (EOM) characters. Within the Data Processing Center DPC, the terminals T1–T9 and the Mulcoms M1–M3, the characters are generated and transferred in a digital form. Binary coded representations, 1 or 0 bits, + or − levels, which are well known in the art, are normally encountered.

More efficient and accurate handling of the information over the telephone lines 101 and 102 is insured if the digital impulses are used to develop corresponding modulated carrier signals which are then transmitted between the equipment at either end of the line instead of the original digital impulses.

Digital impulses from the Data Processing Center DPC are changed to a modulated form in the modulator M section of subset DS–4 prior to transmission over the line 102. The modulated impulses are subsequently demodulated in the demodulation sections D of the Digital Subsets DS–1, DS–2 and DS–3, which are connected to the line 102. Messages from the Data Processing Center to the terminal equipment are termed output messages, while messages from the terminal equipment to the Data Processing Center are referred to as input messages. Demodulated bits of information from each subset are transferred through an associated Output Mulcom (OM) portion of one of the Mulcoms M1–M3 for subsequent relay to the terminal equipments connected therewith.

On input to the Data Processing Center, messages are transferred from a particular terminal equipment through the Input Mulcom IM portion of a selected Mulcom and are modulated in the modulator M section of an associated Digital Subset for transmission over the line 101 to the Data Processing Center. The modulated signals on the line 101 from a transmitting Mulcom are demodulated by the demodulator D section of the Digital Subset DS–4 at the Data Processing Center, which restores them to a digital form for processing by the center.

It will be noted that the Mulcoms M2 and M3 have an additional demodulator which is connected to the input line 101 for monitoring purposes.

*Signal characteristics*

The form of the signals applied to the lines 101 or 102 in FIG. 1 is not significant in the practice of the invention. The signals might be of the direct current type encountered in certain telegraphy applications, or the modulated type of signal found in carrier telegraphy and carrier telephony systems. In addition, the lines 101 and 102 could represent channels of communication used in radio broadcasting systems which do not involve solid wire transmission at all.

If a carrier type system is employed which would involve the modulation and demodulation proposed in the preferred embodiment of the invention, any of a number of types of modulation may be satisfactorily used, such as amplitude modulation, phase modulation, or frequency modulation. These types of modulation and methods for accomplishing them are adequately discussed in Electronic Circuits and Tubes, Cruft Electronics Staff, McGraw-Hill Book Company, Chapter XIX, Principles of Modulation, Chapter XX Methods of Modulation, and Chapter XXI Detection (Demodulation). The above mentioned chapters encompass pages 612–716 of the 1947 edition of the Cruft volume. The principles discussed herein are applicable to radio transmission of solid wire transmission.

In a practical application some form of carrier system, phase modulated or frequency modulated, would be employed. In the suggested embodiment discussed herein a single predetermined carrier frequency is selected, and each of the Mulcoms M1–M3 as well as its associated terminals has access to the line without interference from any of the other Mulcoms or terminals by the use of time multiplexing.

*The data processing center* (*DPC*)

A suitable apparatus for performing the functions of the DPC is disclosed in U.S. Patent 2,974,866, Electronic Data Processing Machine, J. A. Hadded, et al., same assignee as this application. Other well known forms of computing equipment could perform the DPC function satisfactorily.

*The terminal equipment*

The terminal or source equipment represented by the blocks T1–T9 in FIG. 1 can assume many forms. For example, it may be of the type discussed in U.S. Patent 2,975,228 — C. R. Doty, et al. — Data Transmission System, same assignee as this application where data impulses are derived from a punched card. Other source media such as punched tape or manually or automatically operable typewriter equipment of well known configurations may be employed. Preferably each of the terminals T1–T9 would have local buffer storage facilities wherein information could be entered from the terminal to await interrogation by the controlling Mulcom or wherein messages could be received from the Mulcom. Since the Mulcom in a typical case operates at a high rate of speed, it is desirable to have the characters of information stored and ready to go when the Mulcom is ready to scan the terminal equipment.

*Basic circuits*

Figure 11:
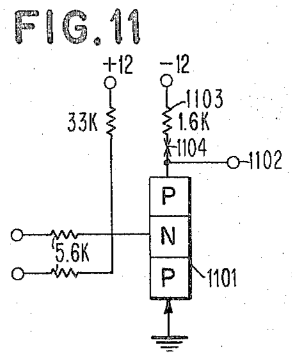
Figure 12:
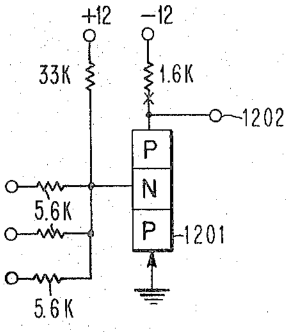

FIGS. 11 and 12 represent two basic complementary transistor or NOR logic circuits which are used in a number of configurations. Other circuits which are used herein are shown in FIGS. 13–15 and FIGS. 23–28. FIG. 11 represents a two input circuit, which includes a PNP transistor 1101. FIG. 12 represents a circuit block which is similar to that of FIG. 11, with the exception that it has three inputs. This circuit includes a PNP transistor 1201.

NOR logic is well known in the art at the present time, and is described in numerous books and publications. An excellent general treatise appears in the book "Design of Transistorized Circuits for Digital Computers," by A. I. Pressman, pages 190–220, published by John F. Rider Publisher, Inc.

Complementary transistor logic circuits are characterized by resistor input networks and inverted signal outputs. The transistors are usually operated in saturation when conducting. The logic of the block functional symbol is performed by the resistor input network, while the transistor inverts and amplifies the resistor network output.

Two sets of voltage swings or lines are encountered. These are:

| | | | |
|---|---|---|---|
| | | *−R Level* | *+R Level* |
| R Line | Minimum | +.2 volts to | +5.6 volts. |
| | Maximum | −.3 volts to | +12.0 volts. |
| | | *−S Level* | *+S Level* |
| S Line | Minimum | −5.6 volts to | −.2 volts. |
| | Maximum | −12.0 volts to | +.3 volts. |

Both of the circuit blocks of FIG. 11 and FIG. 12 may be used for performing any one of three logical functions, that is, the complemented +AND function, the complemented −OR function, or the inversion function. When used for the inversion function, only one input line is used and the other input lines are left floating, or disconnected. The choice of which circuit to use depends on the number of inputs that have to be handled and the logical functions desired. With the component values and voltage levels shown, the functions of the circuits of FIGS. 11 and 12 are obtained in the following manner:

| Function | Inputs | Output |
|---|---|---|
| Complemented +AND | All inputs zero volts | −6 to −12 volts. |
| Complemented −OR | One or more inputs, −6 to −12 volts. | Zero volts. |
| Inverter | Single input, −6 to −12 volts. | Do. |
| | Single input, Zero volts (Remaining inputs, being disconnected are also at a zero level). | −6 to −12 volts. |

A number of the circuits of FIG. 11 and FIG. 12 may be joined together or "extended" to handle a greater number of inputs than two or three. This would be necessary, for example, in the case of the −OR block combination 2112 and 2113 shown in FIG. 21, which has five input lines. In order to handle this many inputs, the circuit blocks of FIG. 11 and FIG. 12 are interconnected so that the terminal 1102 of the circuit of FIG. 11 is attached to the terminal 1202 of the circuit of FIG. 12 to form a combined output. When joined in this manner, it is necessary, in order to achieve proper functioning of the combined circuit, to eliminate the load resistor 1103 from the circuit of FIG. 11 when it is connected to the circuit of FIG. 12. This is done by disconnecting the load line in FIG. 11 at the point 1104. The circuit of FIG. 11 is then referred to as an "Extender" or "E" block.

Attention is now directed to the other basic circuits shown in FIGS. 13–15 and FIGS. 23–28.

*Trigger (−TO)*

A detailed diagram of the −TO trigger is shown in FIG. 13. The trigger is a basic −OR circuit cross-coupled with another basic −OR circuit. The PNP transistor 1301 and associated inputs, output and components corresponds to the upper −TO block, such as 1001 in FIG. 10. The PNP transistor 1302 and its associated inputs, outputs and components corresponds to the lower −TO block 1002 in FIG. 10.

The trigger is bistable in nature. −S levels, previously discussed, are used for setting and resetting purposes. A −S level at the terminal 1303 causes the PNP transistor 1301 to conduct this giving a +S level on the line 1304. This state of the trigger and these levels will continue to exist until a −S level signal is applied at terminal 1305 to cause the PNP transistor 1302 to conduct. When transistor 1302 conducts, the feedback on line 1306 cuts off PNP transistor 1301 and the trigger then assumes its off condition, with a −S output on line 1304. Complementary S output levels can be obtained during each condition from line 1307.

The basic +AND and −OR circuits are often coupled to perform a bistable trigger function, such as the −TO trigger shown in FIG. 13. Each circuit continues to perform its own independent function, with output coupled back to inputs in such a manner that the status of the circuit can be maintained without a continuous active external input to either block.

*Single-shot (SS)*

Figure 14:
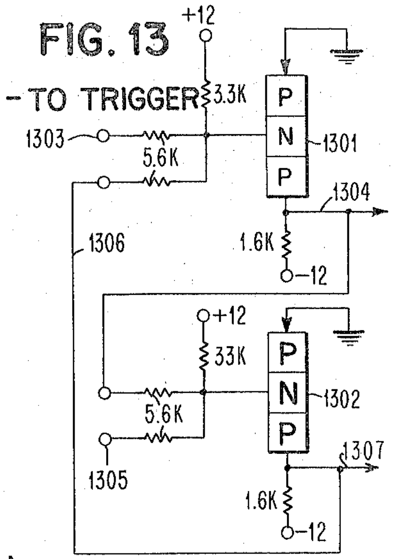

A gated single-shot circuit which is useful in the invention is shown in FIG. 14. The gated single-shot trigger circuit produces output pulses of a fixed time duration. The circuit consists of four PNP transistors 1401–1404 and three capacitors 1405–1407 of different values which are used in the time-out network. An external timing capacitor 1412 can also be connected in the circuit. By changing the wiring to the various capacitors, different output pulse durations are possible. A positive shift to a gated input terminal 1411 starts the single-shot action and provides a negative output pulse of a fixed time duration. This output pulse duration does not depend on the input staying up. A −S level at the gate input 1408 prevents the positive shift from starting the single-shot action. Additional control of the circuit is possible with a special hold input, terminal 1409. This input can be used to initially start or maintain the single-shot active output (−S) regardless of the other input levels. The output remains active for the selected pulse duration after the hold input is released.

A typical application of the single-shot using an external timing capacitor is shown. Both the gate and hold inputs are return to ground (+S).

With the input gate 1408 at +S and the input hold 1409 at +S, the status of the circuit is: transistors 1401 fully conducting, 1402 and 1404 partially conducting, 1403 cut off, and output 1410 at the +S level. A positive shift at input pin 1411, through the input capacitor and the input diode, reverse biases transistor 1401. Transistor 1401 cuts off and transistor 1402 base seeks −12 v. Output pin 1410 falls to a −S level and transistor 1402 reaches full conduction. A negative shift occurs at transistor 1402 emitter, through the selected timing capacitor and 150 ohm resistor 1413, and appears on the emitter of transistor 1404. Transistor 1404 cuts off. This negative voltage shift, developed across the network of resistors 1413–1415 and the 15K potentiometer 1416 also appears at the base of transistor 1403, and forward-biases the transistor 1403 on.

A positive shift at the collector of 1403 is coupled back to the base of 1401 maintaining 1401 cut off. This action is instantaneous through the coupling bypass capacitor 1417. The circuit remains in this status while the selected timing capacitor charges through the resistor network toward +6 v. As soon as the base of 1403 reaches ground, 1403 cuts off and the coupling voltage to the base of 1401 is lost. The input shift has long since dissipated to ground through the input gate pin 1408. Therefore, 1401 resumes conduction and output pin 1410 rises to its former +S level. Transistors 1402 and 1404 resume partial conduction and the timing capacitor discharges through 1404. The circuit is back to normal.

If the hold input is used, pin 1409 is not returned to ground. An active output level can be maintained by establishing pin 1409 at a −S level. Transistor 1404 is biased to full conduction, lowering 1403 base below ground; 1403 conducts, and through the coupling to 1401 base, 1401 is cut off. Transistor 1402 goes to full conducton. Causing 1404 to conduct drives the entire circuit to the same status as for an input signal. When the hold input is released (pin 1409 rises to +S), the timing capacitor must again charge through the resistor network toward +6 v. The output at pin F will remain active until 1403 is cut off by the rise in its base level, and 1401 again conducts.

*TV trigger*

Figure 15:
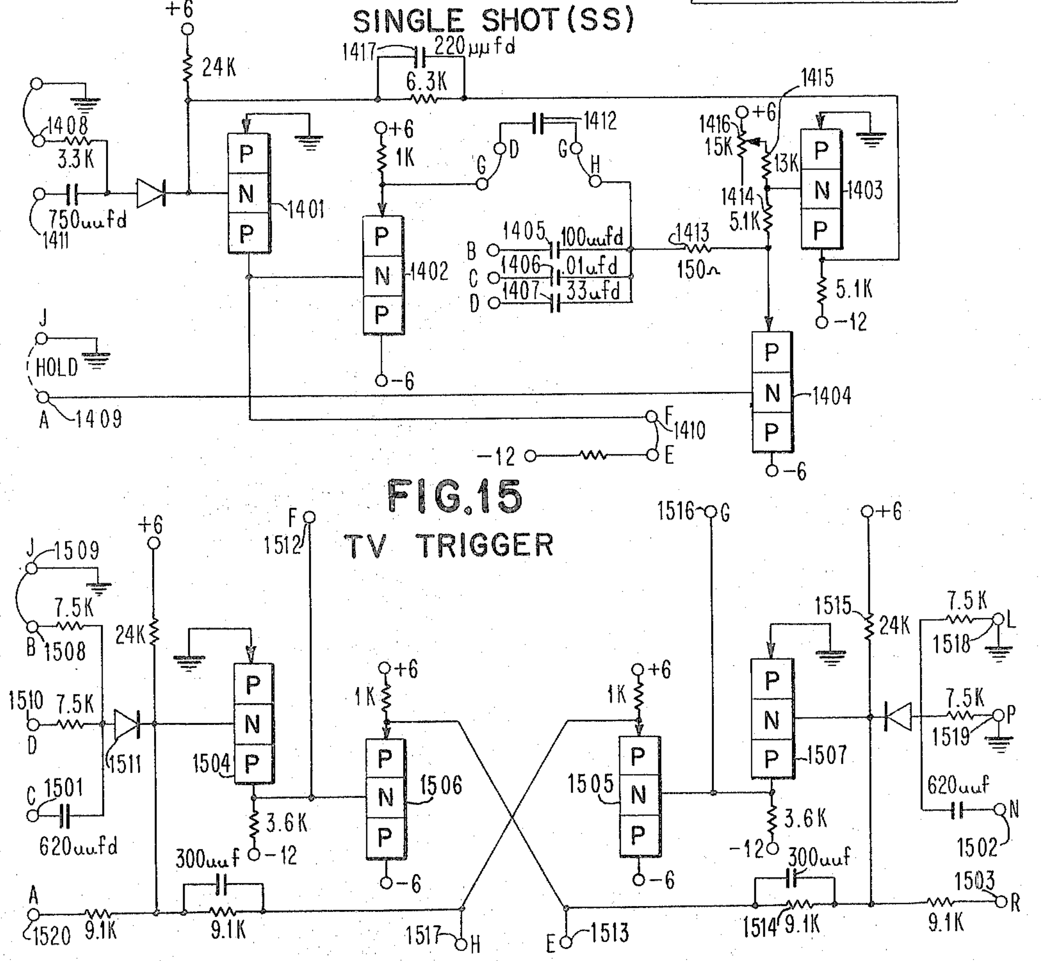

FIG. 15 is a detailed diagram of the TV trigger which is used in the invention.

*Binary operation.*—The trigger may be connected for binary operation (gated or not gated) by connecting one of the gate resistors to the emitter follower output on the same side of the trigger. The other gate input may be then used as an external gate or tied to ground. The two A.C. inputs 1501 and 1502 are connected together and driven from a sample pulse driver to form the binary operation.

*A.C. set input at terminal C.*—For gated input operation, the A.C. set pulse to pins 1501 or 1502 may be either a 3 v. or a 6 v. positive shift.

*D.C. set input at terminal 1503.*—A signal of −5.56 v. (or more negative) applied to the D.C. set input triggers the circuit.

Assume a starting condition (FIGURE 15) of transistors 1504 and 1505 in full conduction. Transistor 1506 is at minimum conduction, and transistor 1507 is off. With one gate (pin 1508) tied to ground (pin 1509), and the other gate (pin 1510) gated from −6 v. to 0 v. for 4.5 μs. before the A.C. input shift is applied, a positive going 3 v. pulse of 0.5 μs. is applied to the A.C. set input (pin 1501). The output of the gate at diode 1511 causes the base of transistor 1504 to become more positive than the emitter (ground potential). Transistor 1504 becomes reverse-biased off and its collector voltage tries to go to −12 v. Because of the diode action between the collector and base of transistor 1506, the collector of transistor 1504 is allowed to go only to −6 v. (pin 1512). transistor 1507. The conduction of 1507 causes its col- This negative −6 v. forward biases emitter follower transistor 1506 into full conduction. The emitter of the 1506 follows the base to −6 v. The output of 1506 at pin 1513 is coupled to the base of transistor 1507 through the voltage divider resistors 1514 and 1515, forward biasing lector (pin 1516) to rise from −6 v. to 0 v. This collector voltage rise to 0 v. is fed to the base of transistor 1505 and reduces the forward bias of 1505. The reduced bias on 1505, which is connected as an emitter follower, reduces its conduction so that its emitter rises to 0 v. The emitter output of 1505 (0 v.) at pin 1517 is coupled back to the base of 1504 and holds reverse bias on 1504, thus providing latch back to the circuit. If gating of pins 1518 and 1519 and an A.C. set pulse at pin 1502 are applied, the trigger is flipped to its original state.

*Power inverter (IP)*

Figures 23, 24:
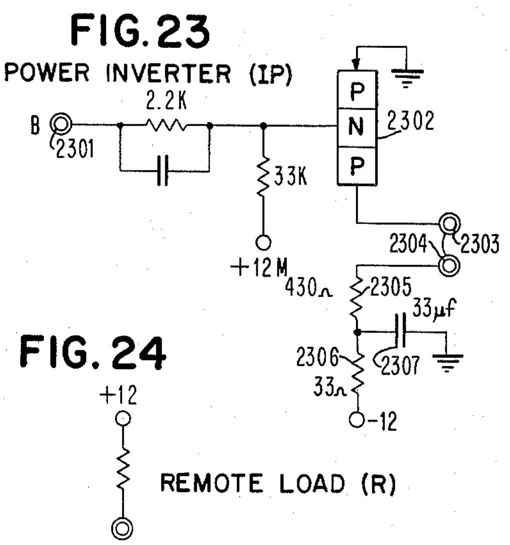
FIGS. 23–28 are additional basic circuit blocks which are used in the invention.

The Power Inverter, FIGURE 23, provides a large power output to drive branching circuits or transmission lines. A relatively small S line input results in an amplified and inverted S line output.

Assume a +S input to pin 2301, FIGURE 23, reverse-biasing transistor 2302 off. The collector of 2302 is near −12 v.; the exact level depends on the load connected to pins 2303 and 2304, that are wired together. When the input falls to −S, the base of 2302 tends to drop below ground. The emitter of the transistor clamps the base at about −.2 and the transistor goes into saturation. Output pins 2303 and 2304 rise to a +S level (near ground) because of voltage drop across the 430 ohms resistor 2305.

The 3.3 ohm resistor 2306 and 33 μfd. capacitor 2307 network decouples the collector load resistor from the −12 v. supply to prevent the sudden current demand from affecting other nearby circuits.

*Remote load (R)*

FIGURE 24 shows a remote load. The output of any transistor is basically an electric current. The purpose of this load device (usually a resistor) is twofold: first, to limit the current through the transistor, and second, to provide a voltage level based on the amount of current flow so that other transistors can be controlled. A voltage pulse with little current demand tends to degenerate because of line capacity and resistance. Therefore, when the output transistor is separated from the input network of the next transistor by a considerable distance, it is desirable to develop the controlling voltage near the input network.

*Driver, Emitter Follower (DE)*

Figure 25:
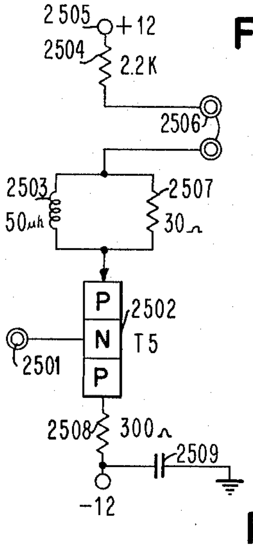

The PNP emitter follower circuit, FIGURE 25, serves as a non-translating current amplifier that drives additional logic or branching circuits. Emitter followers also serve as buffer devices to match impedances or provide isolation. A light D.C. voltage shift results between the input and output voltage signals.

Assuming a −0.2 volt potential at pin 2501, transistor 2502 base is at about −0.2 v. and 2502 is in partial conduction. This current flows through the low resistance inductor 2503 into the 2.2K emitter follower resistor 2504, to the +12 v. supply at pin 2505. The base-emitter drop of 2502 (0.2 v. to 0.4 v.) causes a slight voltage shift between the input and output signals. A +S output exists at pin 2506.

If a −S level of −12 v. is applied at terminal 2501, the forward bias on transistor 2502 is increased. Current through 2502 starts to increase but is momentarily resisted by the inductor 2503. The voltage drop developed across the parallel LR network of inductor 2503 and resistor 2507 holds the output positive until the counter-E.M.F. is overcome. Then, the output drops sharply to the −S level and the transistor is in full conduction.

The circuit is returned to its original status by a +S level to 2502. The rise to the +S level is similarly resisted by the inductor and again a sharp shift results.

Because of the relatively low impedance offered by the emitter follower, the output level is little affected by the output loading (within limits). The 300 ohm collector resistor 2508 limits the power dissipation across 2502. The 0.01 u.f.d. capacitor 2509 filters to ground any oscillation or ringing that might be introduced onto the −12 v. line by the coil.

*R-to-S Converter (C)*

Figure 26:
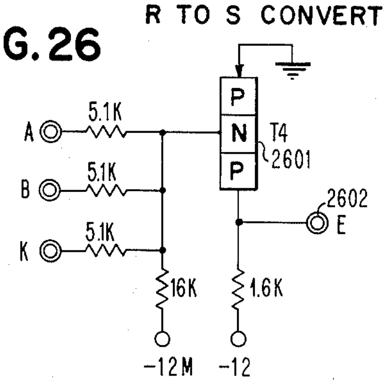

The PNP Converter circuit, FIGURE 26, is used for repowering and level setting of signals. It performs a basic logical function (+O, −A, C) and inverts an R line input level to an S line output level. The logical function is performed by the input resistor network and the invert function is accomplished by the common emitter transistor configuration. In the −AND, invert logic application illustrated, a +S output is obtained only when all the inputs are down at a −R level.

The base of transistor 2601 is biased by the voltage developed across the input divider network. The exact level of this bias depends on the number of inputs used in their levels. Input levels may vary at their high levels, but all will go to ground (−R) when down. A +R level at any one of the inputs holds the base voltage of 2601 above the emitter voltage and keeps the transistor cut off, causing a −S level to exist at pin 2602. The exact output level at pin 2602 is dependent on the circuit loading.

When all inputs used are at the −R level, current flow from the −12M supply decreases the base voltage of 2601 below ground potential. Transistor 2601 is forward-biased into saturation, and increases the output at pin 2602 to the +S level.

*Power Driver DP*

Figure 27:
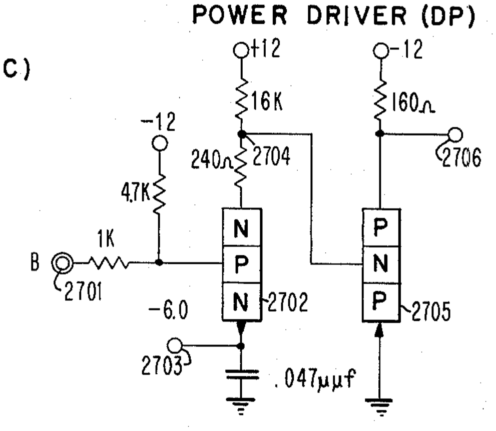

The circuit of FIGURE 27 is a power driver that provides impedance matching as well as higher current requirements to a driven line.

A +S input to terminal 2701 causes NPN transistor 2702 to conduct due to the forward biasing that exists between the emitter (−6.0 volts from terminal 2703) and the base. When transistor 2702 conducts a +.2 or +.3 level will exist at the junction point 2704.

With a −.2 volt potential at point 2704, the PNP transistor 2705 will be forward biased into conduction and supply a +S level at the output terminal 2706.

*Gated Sample Pulse Driver (DSP)*

Figure 28:
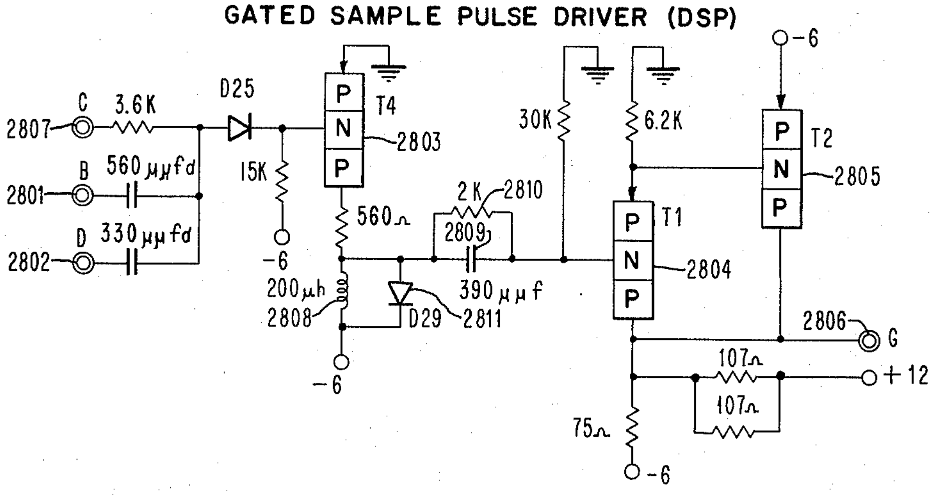

The gated sample pulse driver, FIGURE 28, provides about a 1 μs. output pulse regardless of the input signal duration. A gated, positive signal to either input terminal 2801 or 2802 starts the single-shot action.

The normal status of this circuit is: transistors 2803 conducting, 2804 partailly conducting, 2805 cut off, and output pin 2806 at −9.5 v. The two inputs 2801 and 2802 are both conditioned by a single gate at pin 2807 that must be up to 0 v. before either input can operate the circuit. The output expected is a 3 v. positive, 1 μs. pulse regardless of input signal duration in excess of 1 μs.

With the input gate pin 2807 at 0 v. for more than 7.5 μs., a positive shift at input pin 2801 cuts off transistor 2803. The attempt to reduce current through a 200 μh. inductance coil 2808 is resisted with a strong negative potential at the normally positive end of the coil. This negative spike passes through a 390 μμf. capacitor 2809 and drives transistor 2804 base negative. The emitter of 2804 seeks to follow the base but is clamped by the emitter-base diode action of 2805. The 2804 base is, in turn, clamped by the 2804 emitter. Transistor 2805 goes into full conduction and brings output pin 2806 up to −6 v. This level is maintained while the 390 μμf. capacitor 2809 charges to −5.2 v., through the 2804 emitter-base junction and the 2805 emitter-base junction. Transistor 2805 is reverse-biased off when its base rises more positive than its emitter (−6.0 v.) and drops the output at pin 2806 back to −9.5 v.

The input signal must extend beyond the 1 μs. period to allow the circuit to time out. The 390 μμf. capacitor 2809 discharges through a 2K resistor 2810.

The diode 2811 in parallel with the inductor 2808 prevents oscillation or ringing in the coil and speeds circuit recovery.

*Carrier On Signal*

The presence of carrier is indicated by a −S carrier level on line 1024 in FIG. 10. A signal of this kind can be derived from any of a number of well known carrier detection circuits, such as the one discussed on page 79 of Handbook of Industrial Electronic Circuits, John Markus and Vin Zeleff, McGraw-Hill Book Company, Inc., and entitled Carrier-Actuated Relay for Automatic Relay Transmitters and Alarms.

Figure 6:
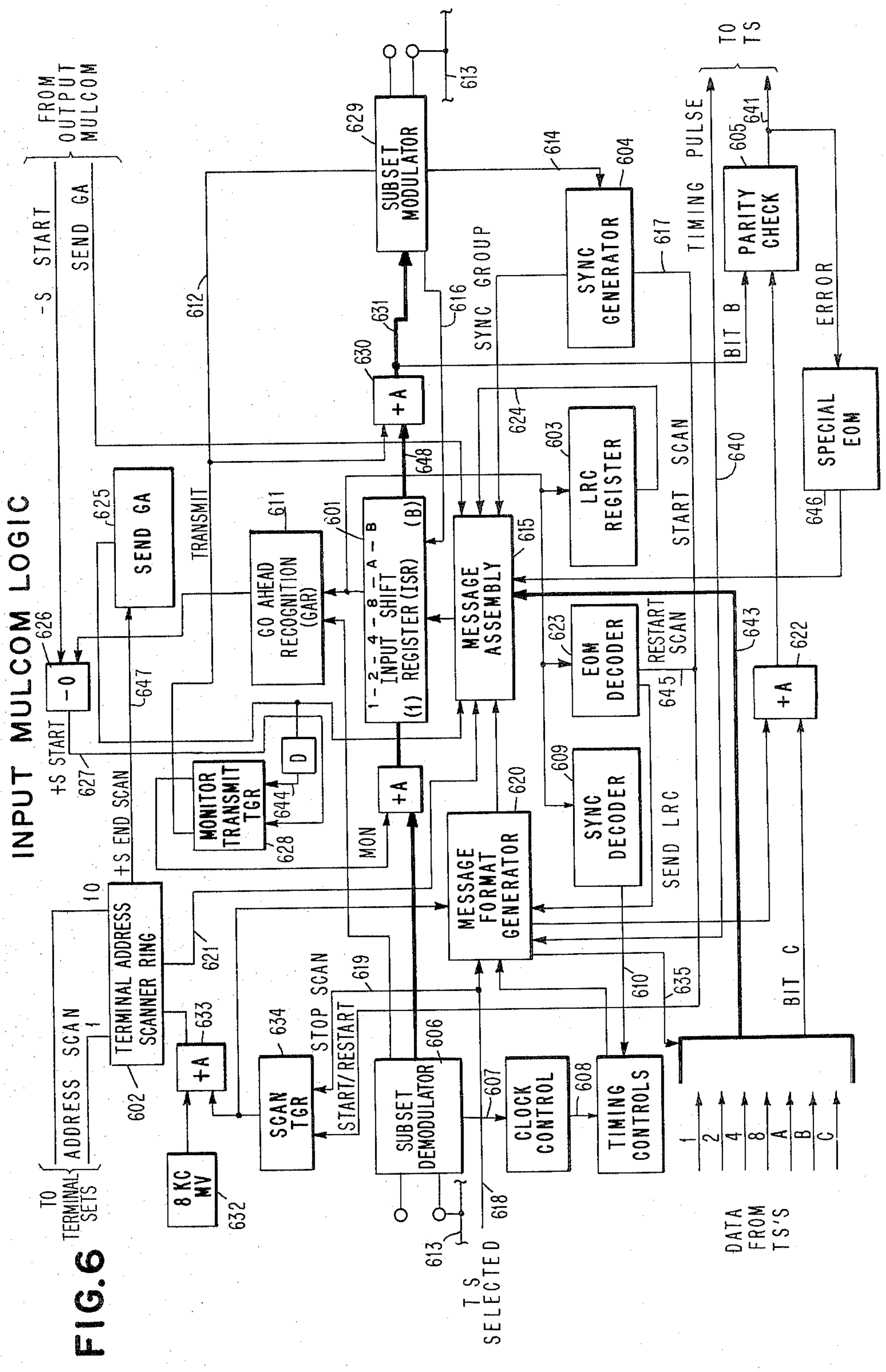
FIG. 6 is a more detailed representation of an input portion of multiplexing equipment shown in FIG. 1, the representation being illustrative merely, and not corresponding on a block-by-block basis with those of its component circuits which are shown in other figures herein.

Many of the other circuits in FIGURE 2 and FIGURE 6 can take forms that are well known in the art at this time. These would include for example, the clock pulse sources and timing or scanner rings, the bistable triggers, the decoders, the encoders and the data registers, LRC registers, and shift registers. Adequate discussion of these circuits for those skilled in the art can be found in the book "Pulse and Digital Circuits," Jacob Millman and Herbert Taub, McGraw-Hill Book Company, Inc., 1956 edition.

*Interconnections—Subset to Mulcom*

Figure 4:
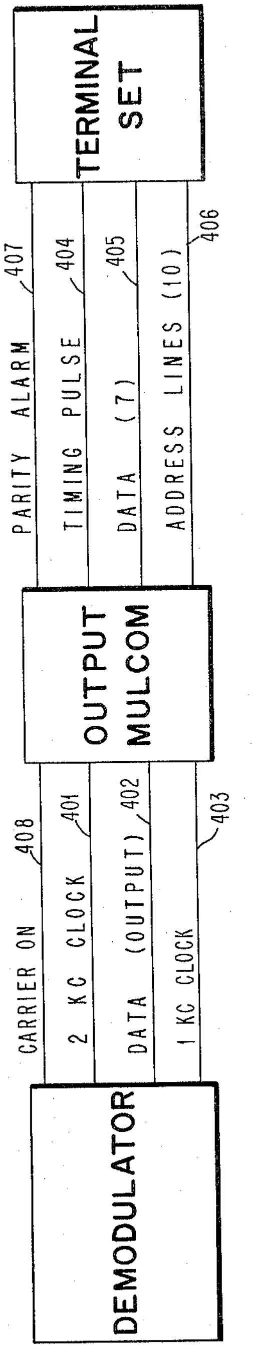
FIG. 4 represents interconnections between certain of the equipments of FIG. 1.

The data and control lines between a Digital Subset and its associated Mulcom are indicated in FIG. 4 and FIG. 8. These connections are made available at pluggable connectors attached to the respective equipments, and the junction point is commonly referred to as the "interface."

*Connections—Subset to Output Mulcom*

*2 kc. clock.*—This line, 401, has a series of pulses that are UP for 250 μsec. and DOWN for 250 μsec. The rise of these pulses coincides alternately with the rise or fall of a 1 kc. pulse. They continue as long as carrier-on from the Subset is UP. These pulses are used to control Output Mulcom timings.

*Output data.*—This line, 402, is used to transfer data bits received from the DPC to the Output Mulcom. A DOWN level or MARK, at the interface, indicates reception of a "0" bit and an UP level or SPACE at the interface indicates reception of a "1" bit. Data is sampled, on this line, at the fall of the 2 kc. pulse.

*1 kc. clock.*—This line, 403, has a series of pulses that are UP for 500 μsec. and DOWN for 500 μsec. They continue as long as carrier-on from the Subset is UP.

*Connections—Subset Demodulator to Input Mulcom*

*2 kc. clock.*—Two kilocycle clock pulses are received from the Subset on the clock line 801 to control Input Mulcom timings during Monitor mode operation.

*Monitor Data.*—The Mon Data line 802 provides for transmittal of serial data bits from the monitoring receiver such as receiver 606 in FIG. 6 to the Input Shift Register 601 (ISR).

*New Sync.*—The New Sync line 803 is conditioned after a Go Ahead message is received, when in the Monitor mode, to allow the Subset to achieve bit sync sooner after the next transmitter is turned on.

The line is used to signal the Digital Subset that the

Mulcom, which was transmitting, has finished transmitting. The Subset must then prepare to re-synchronize with the next Mulcom that transmits. The Mulcom causes this line to rise whenever it determines that subsequent data received by it will be preceded by a bit synchronization pattern containing a new phase reference. The line is normally DOWN. The line is raised after the fall of the 1 kc. clock pulse that coincides with the last two bits of a message character group. It remains UP for one millisecond and is then dropped to the DOWN level again.

*Carrier On* (*CO*).—This line, 804, rises to the UP level after the Subset has been receiving carrier for a nominal two milliseconds. It is held at this level as long as the Subset is receiving carrier. It falls to the DOWN level over a nominal period of ten milliseconds when the receiving Subset loses carrier.

*Connections—Subset Modulator* (*Mod*) *to Input Mulcom*

*2 kc. clock* (*Mod*).—The two kilocycle clock pulses are received from the Subset on line 805 from the subset transmitter, when in Transmit mode, to provide timing for data transmission through the Mulcom. The line has a series of pulses that are UP for 250 $\mu$sec. and DOWN for 250 $\mu$sec. The rise of each pulse alternately coincides with the rise or fall of a 1 kc. pulse and pulses continue as long as the Subset has power.

*1 kc. clock* (*Mod*).—A requirement of the subset is that the Request to Send occur coincident with the rise of the 1 kc. clock pulses from the transmitter. The 1 kc. clock line 806 is used to turn on the transmit trigger in the Mulcom for establishing On-Line operations and to attain the correct timing relationship between the Mulcom and the Subset. The line has a series of pulses, each of which is UP for 500 $\mu$sec. and DOWN for 500 $\mu$sec. They continue as long as the Subset has power.

*Request to Send* (*RS*).—This line, 807, conditions the transmitter in the Subset to allow data transmission on the Data Input line 809 to start. Immediately after the Request To Send line is conditioned, the transmitter starts sending bit snyc on the input line 613 in FIG. 6. The line 807 is raised by the Input Mulcom after it has received a Go Ahead message and has become active, and it is held up until all input messages from this Mulcom to the DPC have been transmitted.

The line is normally DOWN. The rise of this line to the Subset coincides with the rise of a 1 kc. pulse from the Subset. The RS line falls, coincidentally, with the rise of the next 1 kc. pulse following transmission of the last data bit from the data terminal to the Subset.

*Clear To Send* (*CS*).—A Clear To Send signal originates in the Subset and indicates to the Mulcom on line 808 that the Subset has provided sufficient bit sync over the input line 101 and is ready to transmit data supplied by the Mulcom. The Clear To Send line gates the character sync group to the Input Shift Register 601.

The line is normally DOWN and is raised by the Subset to signal the Mulcom that data transmission can commence at the beginning of the next 1 kc. pulse. The raising of this line to the UP condition coincides with the fall of the ninth 1 kc. pulse which follows the rise of the RS line 807 to the UP condition. This line is held in the UP position while data is being transmitted. The fall of this line coincides with the rise of the second 1 kc. pulse following the fall of the RS line 807.

*Serial Data Input* (*SD*) *or Input Data*.—The Input Data line 809 carries data from the "B" position of the Input Shift Register 601 (ISR) to the Subset Modulator 629 for transmission on the input line 613 to the DPC. Data transmission is serial-by-bit over the line 809. The line is at an UP level or SPACE, at the interface, to indicate the presence of a binary "1" bit for transmission and at a DOWN level or MARK at the interface, when the presence of a "0" bit is to be indicated. Data is stabilized on this line within a few microseconds after the rise of each 2 kc. pulse received across the interface from the Subset. The Mulcom holds this line at a constant level until the rise of the succeeding 2 kc. clock pulse. Data is sampled at the fall of each coincident 2 kc. pulse.

*Interconnections—Mulcum to Terminal Set Connections—Output Mulcom to Terminal Set*

Connections between the Output Mulcom and one of its associated terminals are shown in FIGURE 4. These are as follows:

*Parity Alarm*.—Detection of an error between the generated and received LRC characters conditions the Parity Alarm line 407 to turn on the Alarm—Ask for Repeat light at the addressed terminal set.

*Timing Pulse*.—The Timing Pulse line 404 is common to all connected terminal sets, but is recognized only by the terminal previously selected. The Timing Pulse is sent to the terminal set as each data character is assembled by the Output Mulcom and causes the terminal set to store the information on the data line at that time.

*Data*.—Seven data lines in a data bus 405 provide for parallel transfer of 7-bit characters from the Output Mulcom to any connected Terminal Set.

*Address Lines*.—Ten lines in the address bus 406 are provided to select any one of the 31 possible Terminal Sets with each Terminal Set being connected to five particular lines, depending upon the assigned address.

*Connections—Input Mulcom to Terminal Set*

Control lines and data lines between an Input Mulcom and one of its associated Terminal Sets are also shown in FIG. 8. The following lines are provided:

*System Available*.—The System Available line 810 is used to turn on a System Available light to signal the Terminal Set operator that the system is ready for use. The line is also used as an interlock line to control selection of the Terminal Set. This line is common to all Terminal Sets.

*Parity Alarm*.—This line, 811, turns on a light on the terminal unit to signal that an incorrect or incomplete input message has been sent. The input message may be incorrect due to the sensing of a parity error in data received from the Terminal Set or it may be incomplete due to the receipt of an output message from the DPC for a particular Terminal Set which caused the loss of a portion of the input message that was currently being transmitted from the same Terminal Set.

*Address Scan*.—Ten lines from the Terminal Address Scanner 602 are connected through a bus 812 in common to all Terminal Sets. Each Terminal Set, by selective connection to the lines, decodes and recognizes only its own address.

*Terminal Set* (*TS*) *Selected*.—When a Terminal Set is addressed and has a message waiting to be sent, the TS Selected line 813 (a line common to all TS's) is conditioned to stop the Terminal Address Scanner and condition the Input Mulcom to start sending an input message.

*Timing Pulse*.—A pulse on the line 814 signals the Terminal Set to take a core buffer cycle and to place a data character on the seven data lines in a data bus 815. The data is sampled into the Input Shift Register 601 500 $\mu$sec. later. The corresponding line in FIG. 6 is line 640.

Seven data lines are present in the data bus 815 and are connected in common to all Terminal Sets. Each terminal, when selected, transmits a character at a time over the lines under control of the timing pulse on line 814 from the Mulcom.

*Digital Subset*

The Digital Subset DS–1 consists of a single package that contains demodulator, modulator, and power supply. The Subsets DS–2 and DS–3 contain additional demodulators for monitoring purposes.

The control and data lines between a Subset and its associated Mulcom, FIGURES 4 and 8, are assumed to be at an "UP" level or a "DOWN" level.

The UP level is defined as a nominal voltage greater than +3 volts.

The DOWN level is defined as a nominal voltage lower than −3 volts.

Digital Subsets for performing the functions of DS-1, DS-2 and DS-3 are well known in the art at this time. A general discussion of modulating and demodulating equipment of this type may be found in the Army Technical Manual TM 11-679, Fundamentals of Carrier and Repeater, Chapter 4—Carrier Telephony.

*Subset—Transmitting*

Figure 7:
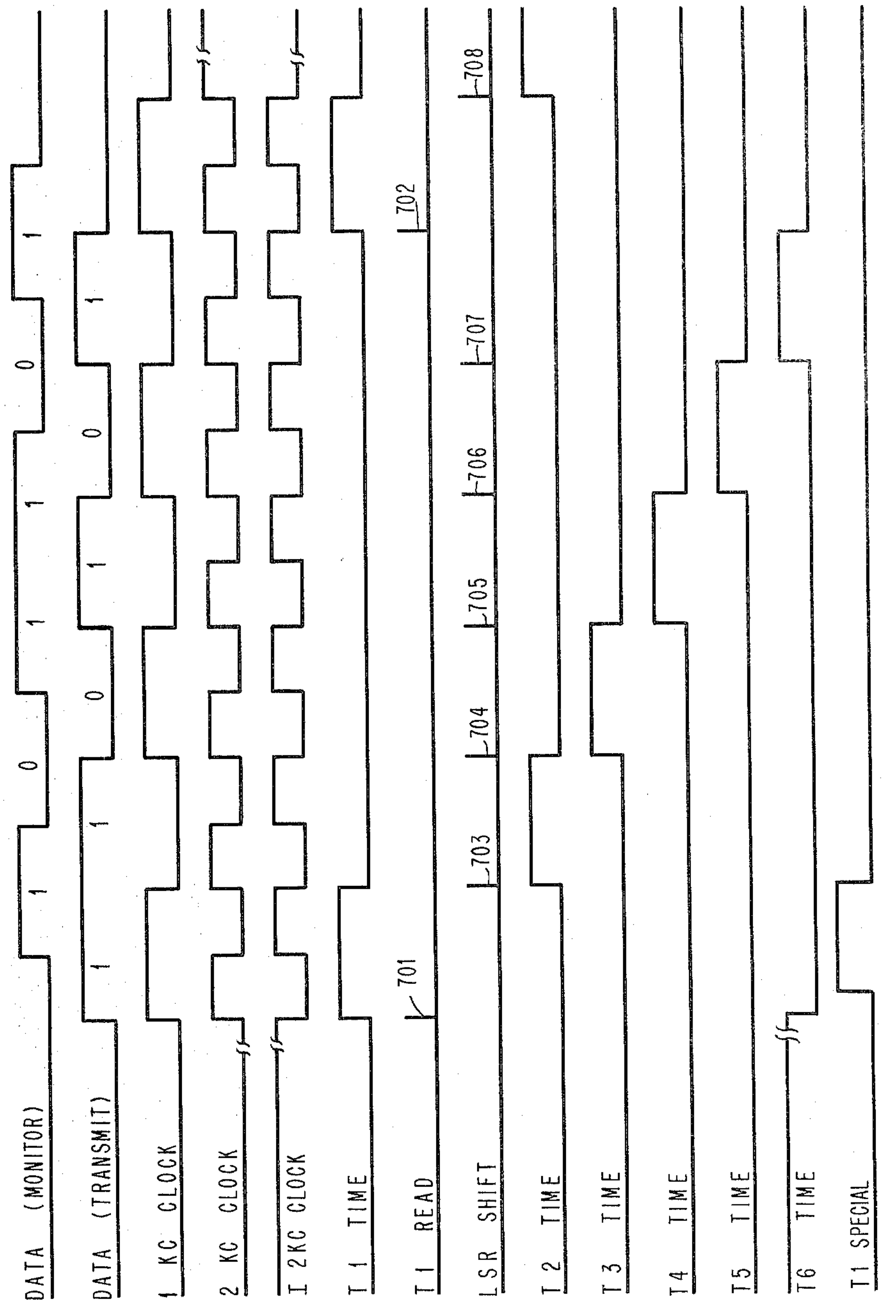
FIG. 7 represents pulses normally encountered in the equipment of FIG. 6.

The Subset, FIGURE 8, generates 1 kc. clock pulses and 2 kc. clock pulses, FIGURE 7, as power is on. When the Input Mulcom wants to transmit, it raises an appropriate internal request line. With the internal AND condition of this line and the next received 1 kc. pulse, the Input Mulcom raises the Request To Send (RS) line 807 to the Subset thus causing the Subset to turn on its modulator and commence the generation of a series of Marks which are transmitted to other receiving Subsets for use in "bit" synchronization. The transmitting Subset subsequently raises the Clear To Send (CS) line 808 about 8.5 milliseconds after the rise of the RS line 807. The Input Mulcom can start presenting data to the Subset immediately after the rise of the next 1 kc. pulse. The Mulcom will continuously present data on the Data Input line immediately after the rise of each succeeding 2 kc. pulse. The Subset samples this data at the fall of each 2 kc. pulse.

When the Input Mulcom has completed transmission, it drops the RS line 807 coincidentally with the rise of the next 1 kc. pulse which follows the last data "bit" transmitted to the Subset. The Clear to Send line 808 is then dropped by the Subset upon the rise of the second 1 kc. pulse following the dropping of the RS line 807. At this time, the transmitting Subset turns off Carrier.

*Subset—Receiving*

When the Subset starts to receive Carrier, it brings up the Carrier ON line, FIGURE 8, and begins transferring demodulated data to the Output Mulcom over the Output Data line 402. It also transfers the 1 kc. and 2 kc. clock pulses to the Output Mulcom over the respective lines.

Each new "bit" of data is presented over the Output Data line 402 at the rise of its associated 2 kc. pulse and the Mulcom samples this data at the mid-point of this data, namely at the fall of the 2 kc. pulse.

The first bits received by the Mulcom will be a series of 0's which is a "bit" group generated by the transmitting Subset to get the receiving Subset into Bit Synchronization. The duration of this synchronization group has been determined by the transmitting Subset. Data, as presented by the transmitting Subset, immediately follows this group with no break between the latter and the former. It is the function of the Mulcom to determine when significant information starts.

When the last "bit" of information has been received, the Subset continues to present random data to the Mulcom for a nominal ten milliseconds. During this time the Carrier ON (CO) line 804 is decaying to the DOWN level. The dropping CO line causes the Subset to gate the Output Data line to the DOWN level which, in turn, is held in this condition until the receiving Subset begins to receive Carrier again. When the Subset is not receiving, it continues to generate random 1 kc. and 2 kc. pulses on the designated lines.

The New Sync (NS) line 803 is used by those receiving Subsets that expect to have a multiplicity of remote Subsets transmitting to them in a closely following, sequential manner. In this case, when the Mulcom receives the last bit of the last character that it expects to receive, it raises the New Sync (NS) line 803 for a period of one millisecond then immediately drops it to the DOWN level again.

*General Description—Mulcom*

Each of the multiplexing and communication units, or Mulcoms M1–M3, controls the sharing of the high speed data transmission lines 101 and 102 among its associated local terminals. Each Mulcom consists of two nearly independent halves; one for output messages from the Data Processing Center, FIG. 2, and one for input messages to the Data Processing Center, FIG. 6. Because it is designed to operate with a duplex telephone channel, both halves can operate simultaneously.

The Mulcoms M1, M2 and M3 recognize requests for service by their associated Terminal Sets and assign to each set a portion of the line time. As one Mulcom completes transmission of all of its Terminal Set messages, it transfers control by means of a control message to the next Mulcom in line proceding from the Mulcom at the far end of the line with relation to the Data Processing Center. Each Mulcom and its related Data Subset DS convert the parallel bits of data of the Terminal Sets to serial bit form for transmission. The Mulcoms have provision for generating and transmitting a Longitudinal Redundancy Check character (LRC) at the end of a message.

On output, the Output Mulcoms OM listen to all traffic. When a message addressed to one of its terminals is detected, a selected Output Mulcom establishes the connection betwen the demodulator section of its Subset and the appropriate terminal buffer. As data characters are passed to the terminal, the Mulcom compiles and checks a Longitudinal Redundancy Check character (LRC). If the check fails, the message is deleted from the terminal buffer and an error indicator is turned on at the terminal.

On input, the Input Mulcom IM connects to its modulator, in sequence, each of its terminal buffers requiring service, precedes the buffer contents with the necessary character and bit synchronization groups, and terminal and Mulcom identification, and suffixes the message with an LRC check character which it has compiled.

Interaction betwen the two halves of any Mulcom arises when the Output Mulcom OM and any module of the same terminal simultaneously request use of the same buffer assigned to a particular Terminal Set. Because there is no direct reply for output messages, output message takes precedence and locks out input messages toward the computer. If the buffer is being used for input, the input message is cut off immediately and a special End of Message character is affixed along with the Longitudinal Redundancy Check character.

The Output Mulcom also locks all of its terminals and turns on warning lights if it is informed by its associated Subset that the carrier has disappeared from the output line 102. This alarm is labeled "System Unavailable," and can result from conditions at the Data Processing Center as well as a communication failure.

Data is transmitted and received by bits which represent characters. Each character basically has six significant bit positions which are designated B-A-8-4-2-1. Only these six bits for each character are transmitted between the Mulcoms M1–M3, and the Data Processing Center DPC. A seventh bit position (C) is included in each character during transfer between the terminals and the Mulcoms in order to develop an even number of bits in each character or even parity for checking purposes.

All 64 combinations of the six bits can be utilized. However, the all zero bit character is not used for data or control purposes, but it is acceptable as an LRC character. Some characters are used exclusively for control and are not available as data characters. Typical character configurations are indicated below in Table I:

TABLE I.—DATA CHARACTERS

| Key | C | B | A | 8 | 4 | 2 | 1 |
|---|---|---|---|---|---|---|---|
| A | 1 | 1 | 1 | 0 | 0 | 0 | 1 |
| B | 1 | 1 | 1 | 0 | 0 | 1 | 0 |
| C | 0 | 1 | 1 | 0 | 0 | 1 | 1 |
| D | 1 | 1 | 1 | 0 | 1 | 0 | 0 |
| E | 0 | 1 | 1 | 0 | 1 | 0 | 1 |
| F | 0 | 1 | 1 | 0 | 1 | 1 | 0 |
| G | 1 | 1 | 1 | 0 | 1 | 1 | 1 |
| H | 1 | 1 | 1 | 1 | 0 | 0 | 0 |
| I | 0 | 1 | 1 | 1 | 0 | 0 | 1 |
| J | 0 | 1 | 0 | 0 | 0 | 0 | 1 |
| K | 0 | 1 | 0 | 0 | 0 | 1 | 0 |
| L | 1 | 1 | 0 | 0 | 0 | 1 | 1 |
| M | 0 | 1 | 0 | 0 | 1 | 0 | 0 |
| N | 1 | 1 | 0 | 0 | 1 | 0 | 1 |
| O | 1 | 1 | 0 | 0 | 1 | 1 | 0 |
| P | 0 | 1 | 0 | 0 | 1 | 1 | 1 |
| Q | 0 | 1 | 0 | 1 | 0 | 0 | 0 |
| R | 1 | 1 | 0 | 1 | 0 | 0 | 1 |
| S | 0 | 0 | 1 | 0 | 0 | 1 | 0 |
| T | 1 | 0 | 1 | 0 | 0 | 1 | 1 |
| U | 0 | 0 | 1 | 0 | 1 | 0 | 0 |
| V | 1 | 0 | 1 | 0 | 1 | 0 | 1 |
| W | 1 | 0 | 1 | 0 | 1 | 1 | 0 |
| X | 0 | 0 | 1 | 0 | 1 | 1 | 1 |
| Y | 0 | 0 | 1 | 1 | 0 | 0 | 0 |
| Z | 1 | 0 | 1 | 1 | 0 | 0 | 1 |
| 0 | 0 | 0 | 0 | 1 | 0 | 1 | 0 |
| 1 | 1 | 0 | 0 | 0 | 0 | 0 | 1 |
| 2 | 1 | 0 | 0 | 0 | 0 | 1 | 0 |
| 3 | 0 | 0 | 0 | 0 | 0 | 1 | 1 |
| 4 | 1 | 0 | 0 | 0 | 1 | 0 | 0 |
| 5 | 0 | 0 | 0 | 0 | 1 | 0 | 1 |
| 6 | 0 | 0 | 0 | 0 | 1 | 1 | 0 |
| 7 | 1 | 0 | 0 | 0 | 1 | 1 | 1 |
| 8 | 1 | 0 | 0 | 1 | 0 | 0 | 0 |
| 9 | 0 | 0 | 0 | 1 | 0 | 0 | 1 |
| Blank | 1 | 0 | 1 | 0 | 0 | 0 | 0 |

CONTROL CHARACTERS

| | | | | | | | |
|---|---|---|---|---|---|---|---|
| Go Ahead | 0 | 0 | 0 | 1 | 1 | 1 | 1 |
| First Char of Sync | 0 | 1 | 1 | 1 | 1 | 1 | 1 |
| Second Char of Sync | 1 | 1 | 1 | 1 | 1 | 1 | 0 |
| Printer Start | 0 | 1 | 1 | 1 | 0 | 1 | 0 |
| Lights Start | 1 | 1 | 0 | 1 | 0 | 1 | 0 |
| Output Error | 0 | 1 | 0 | 1 | 1 | 1 | 0 |
| Carriage Return | 0 | 0 | 0 | 1 | 1 | 0 | 0 |
| Space | 1 | 0 | 1 | 1 | 1 | 0 | 0 |
| Tab | 1 | 1 | 0 | 1 | 1 | 0 | 0 |
| Backspace | 0 | 1 | 1 | 1 | 1 | 0 | 0 |
| $EOM_{PI}$ | 1 | 0 | 0 | 1 | 1 | 0 | 1 |
| $EOM_{PC}$ | 0 | 0 | 1 | 1 | 1 | 0 | 1 |
| $EOM_{LI}$ (Input Only) | 0 | 1 | 0 | 1 | 1 | 0 | 1 |
| $EOM_{LC}$ | 1 | 1 | 1 | 1 | 1 | 0 | 1 |

Several types of characters are recognized by the Mulcom as follows:

*Go Ahead character.*—The Go Ahead character is a control character. A Mulcom recognizes a Go Ahead message as a command to begin transferring any waiting messages from its Terminal Sets.

*End of Message (EOM) character.*—This is a control character used to condition the Mulcom to process the final character of the message.

*Longitudinal Redundancy Check (LRC) character.*—This is a check character. The Mulcom makes a bit by bit comparison of a received LRC character with a locally developed LRC character that it has generated from the received message. Any combination of bits may exist in this character, but a Mulcom never interprets it as anything but LRC.

Each Mulcom is assigned a specific address character which is used in Mulcom addressing for routing of output messages, and for identification purposes in input messages to the DPC. The addresses of the Mulcoms are established at the time of their installation. Any combination of B, A, 4, 2, 1 bits except all zeros is used in the system for Mulcom address.

No two Mulcoms on the duplex line are assigned the same address character and no two of the Terminal Sets assigned to an individual Mulcom have the same address character. This arrangement makes it possible to address any Mulcom in the system with a single character and to route messages to any Terminal Set attached to a Mulcom with a two-character or three-character address.

*Terminal Set Address characters.*—Address characters in messages serve two purposes. First, they indicate to the DPC a unique identity for each Terminal Set. Second, they provide unique route selecting information so that the replies from the computer will be directed to the proper terminal. In some cases both these functions can be accomplished by the same two characters while in others separate pairs of characters must be assigned. A specific address character is assigned to each Terminal Set and the Mulcom places this in the second character position of an input message. The Mulcom Address is placed in the first character position.

*Message types.*—Each message handled by the Mulcom can be classified either as a data message or a control message. Each type of message has a unique format.

A control message is addressed to a Mulcom to initiate or control an action. Data messages involve the transmission of input or output data.

Since a character sync group (111111 111110) may or may not precede a message, it is not considered a part of the message.

All messages (except Mulcom-to-Mulcom Go Ahead) have a Longitudinal Redundancy Check (LRC) character as the last character of the message. An LRC character is generated for output messages as they are received and is checked against the LRC character actually received in the message. The Input Mulcom generates an LRC and transmits it as the last character of each message, to be checked by the DPC. A compare failure between the transmitted and the generated LRC turns on the Repeat light on the addressed Terminal Set.

Data transmission between a Mulcom and a Terminal Set is in seven-bit characters with the seventh being a parity (check) bit. The parity bit is added by the Mulcom and checked by the Terminal Set for output messages. The parity bit is generated by the Terminal Set, checked by the Mulcom, and then discarded on Input Messages.

Sensing of a parity error on an input message will turn on the Alarm Re-enter light on the Terminal Set; the Mulcom then generates and transmits a special EOM character and an LRC character and terminates transmission from that Terminal Set.

*Data messages*

Each Input Mulcom transmits input data messages when it recognizes that it has access to the line. A Character Synchronization Group precedes the transmission of the first input data message. The Character Synchronization Group is made up of 11 one bits followed by a zero bit. The first bit following the zero bit is the beginning of the first input message. The Output Mulcom receives all output data messages and transfers the body and End of Message characters of messages containing its address to the terminal equipment designated by the Terminal Equipment Address Character.

*Control messages*

Two types of Go Ahead control messages are used.

(1) *Go Ahead (Data Processing Center to Mulcom).*—The Go Ahead message, originating in the Data Processing Center and transmitted on the output line 102, is a signal to the addressed Mulcom to scan its Terminal Sets, to send all waiting messages, and to transmit a Mulcom to Mulcom Go Ahead message on the input line 101. The format is: Go Ahead Character, Mulcom Address Character, End of Message Character, Longitudinal Redundancy Check (LRC) Character.

(2) *Go Ahead (Mulcom to Mulcom).*—Since all of the less remote Mulcoms are monitoring transmission, reception of the Go Ahead character tells all listening Mulcoms, "Prepare to Transmit." The recognition circuitry of FIG. 10, which is provided at each Mulcom, indicates which Mulcom will transmit next. The least remote Mulcom signals the completion of a terminal scan by sending a Go Ahead to the DPC. The format is: Go Ahead Character.

*Output Mulcom OM*

A diagrammatic representation of Output Mulcom Logic is shown in FIGURE 2. This representation is applicable to all of the Output Mulcoms OM in FIGURE 1.

Each of the Output Mulcoms OM recognizes data messages addressed to it and routes such messages to the Terminal Set specified in the address. Each Output Mulcom also checks the validity of received messages, and recognizes and acts on control messages addressed to it.

Data transmission on the line 212, FIGURE 2, which corresponds to the output line 102 in FIGURE 1 can be continuous, i.e., the Mulcom address of one message can immediately follow the LRC character of another. When no messages are to be sent the DPC presents bit sync for transmission on the output line. In this case, a character sync group will precede the next message.

As a message is received, an active Output Mulcom generates a seventh (even parity check) bit for each character and transmits the characters to the proper Terminal Set. A compare failure between the transmitted check character and the generated check character will turn on an alarm light on the addressed Terminal Set.

Transfer of messages between the subset demodulator 201 and the Output Mulcom is serial by bit, serial by character, while transfer between the Output Mulcom and the Terminal Sets on the data bus 211 is parallel by bit and serial by character.

Figure 3:
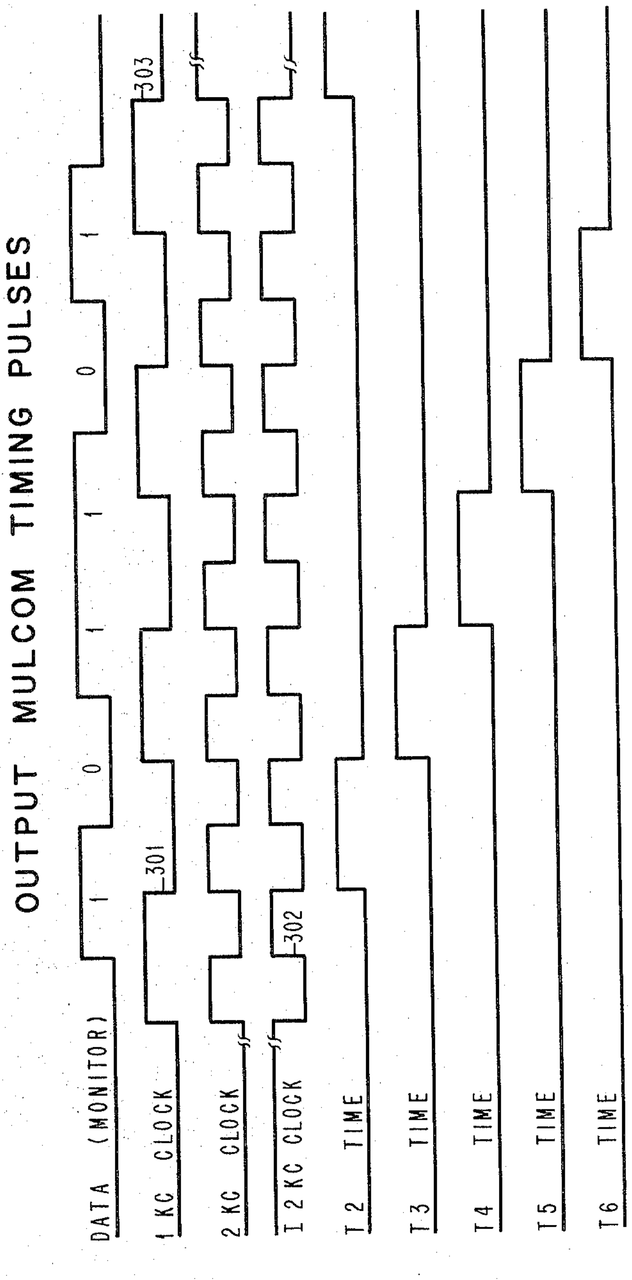
FIG. 3 represents pulses normally encountered in the output multiplexing equipment of FIG. 2.

Significant control pulses encountered in the Output Mulcom are shown in FIGURE 3. These include the 1 kc. and 2 kc. clock pulses, and the T1–T6 pulses. T1 pulses correspond to the 1 kc. clock pulses 301 and 303. The Output Mulcom timing circuits also provide a T1 Read pulse right after T6 time, similar to the T1 Read pulse 701, in FIGURE 7, which is used in the Input Mulcom. A T6 special pulse, not shown, which starts slightly later and terminates slightly before the T6 pulse termination and which has an amplitude comparable to the T6 pulse, is also available. A T6A pulse, which has a duration equal to the first half of the T6 special pulse, and a T6B pulse, which has a duration equal to the last half of the T6 special pulse are also supplied for Output Mulcom control functions.

*Output Mulcom Logic, Timing and Functions*

The Output Mulcom, FIGURE 2, contains three registers: Output Shift Register 206, (OSR), Longitudinal Redundancy Check Register 210 (LRC), Terminal Address Encoder Register 208; and one counter or Timing Ring 204. A Character Recognition (CR) circuit 219 supplies special outputs in response to particular received characters. All operations are accomplished by counting, switching, decoding and sequential stepping operations.

The Output Mulcom uses two different series of 2 kc. clock pulses; one from the Subset 201 for timing during data reception for On-Line operations and the generated clock pulses from the Input Mulcom, FIGURE 6, for Off-Line operation.

Clock pulses from the Subset 201 are gated to provide timing pulses to control Output Mulcom operations when On-Line. The inverted 2 kc. clock pulse, such as pulse 302 in FIG. 3, is used to reset a "6-ones" synchronization trigger in the Sync recognition circuits. Both the in-phase and inverted clock pulses are used to generate timing pulses.

The 2 kc. clock pulses on lines 202 and 203, FIGURE 2, drive the Timing Ring 204 where bit timing for received characters is generated. Timing pulses from the Timing Ring on line 205 are used to control Output Mulcom operations.

The in-phase clock is also used to set data into, and shift the Output Shift Register (OSR) and to step a C-bit (check-bit) trigger in a Parity Generator 213.

Data bits from the Subset to the Output Mulcom are entered into the OSR 206 until a 6-bit character is accumulated. The character is then recognized as a control, address, or data character and treated accordingly.

Reception by the Output Mulcom, FIG. 2, of a Go Ahead message from the Data Processing Center followed by the proper Mulcom address causes the Input Mulcom, FIGURE 6, to begin transmission under control of a signal over line 207, under specific conditions, as hereinafter described.

Recognition of a Terminal Address character in an output message causes that character to be set into the Terminal Address Encoder 208, FIGURE 2, to select addressed Terminal Set over the address bus 209.

Characters transmitted to a selected Terminal Set have a generated parity bit or C bit added by the Output Mulcom for detection of transmission errors. Transmission between the Data Processing Center and the Output Mulcom is checked by setting each complete six bit character received into the LRC register 210 and then comparing the finally developed LRC character with an LRC character that is transmitted. Longitudinal Redundancy Checking simply involves adding the individual bits in corresponding bit positions of succeeding characters in a sum modulo two manner, that is, without carry among the bit positions.

*Output Timing Ring*

Bit timing is established by the timing ring 204 which is a three-stage binary count-up counter that has "1," "2" and "4" trigger positions. When the counter contains a count of six, the next stepping pulse turns on the "1" trigger and turns off the "2" and "4" positions. The counter thus counts to six and then starts over. The outputs of the counter are combined to provide T1–T6 pulses, FIGURE 3. T2–T5 pulses each have a duration of 500 μs. The T1 pulses correspond to clock pulses 301 and 303.

The Timing Ring is stepped by 2 kc. clock pulses, as determined by On-Line or Off-Line operation.

The counter is reset to T6 time by Sync recognition. The next 2 kc. pulse steps the counter and it will continue to step until reset by Sync recognition.

*Output Shift Register (OSR)*

The Output Shift Register 206 (OSR) is a six position trigger register 1-2-4-8-A-B which has a serial input and a parallel output. Serial data is set into the "1" trigger by the 2 kc. stepping pulses and the rest of the register is simultaneously shifted by the same pulse. During T6 time (if data transmission is occurring), the outputs of the OSR are sampled at the selected Terminal Set on line 211. At the end of T6 time, the OSR outputs are also set into the LRC register 210.

*Terminal Address Encoder Register*

The Terminal Address Encoder Register 208 is a five-position trigger register which contains the address of the Terminal Set selected by an output message. Upon recognition of a Terminal Address character in the OSR register 206 that character is set into the Terminal Address Encoder register.

Ten output lines (1, $\bar{1}$, 2, $\bar{2}$ . . . 16, $\overline{16}$) are available to each Terminal Set from the bus 209. Each Terminal Set is connected to five of the ten lines, the particular five lines being determined by the assigned terminal address.

*LRC Register (LRC)*

The LRC register 210 is a six-position trigger register which has parallel inputs and outputs.

Recognition of the assigned Mulcom Address is an output message causes the LRC register to be reset. Each Output Mulcom T1 Read pulse sets the contents of the OSR register 206 into the LRC register 210 just as the first bit of the next character is being set into the OSR register.

Upon recognition of an End of Message (EOM) character, the output of the LRC register 210 is checked at T2 time after the LRC character is set into the register. All positions should be in a reset condition for a correct check. An unsuccessful LRC check condition the Parity Alarm line 220 to the Terminal Sets, and is recognized by the one currently selected.

*Parity Generator*

Parity checking is done with a "C" trigger in the Parity Generator 213. The "C" trigger is reset at the end of T6B time. Each time a one-bit appears on the output data line 215, the "C" trigger is set or reset, depending upon its previous condition. An even number of bits occurring in the character being assembled causes the "C" trigger to end up in a reset condition and, when sampled during T6 time by the Terminal Set on line 216, indicates an even parity for the character. An odd number of bits in an assembled character leaves the "C" trigger on, thus generating a parity bit to make the count even again.

*Output or Terminal Set Timing Pulse*

The output of a Select trigger gates T6A output timing pulses on line 214 to the Terminal Set. The Select trigger is set and the T6A timing pulses are sent to the Terminal Set for each character after the Terminal Address character until recognition of, and including, the EOM character. The Select trigger is reset at T5 time after the EOM trigger is set, or during assembly of the LRC character.

Figure 5:
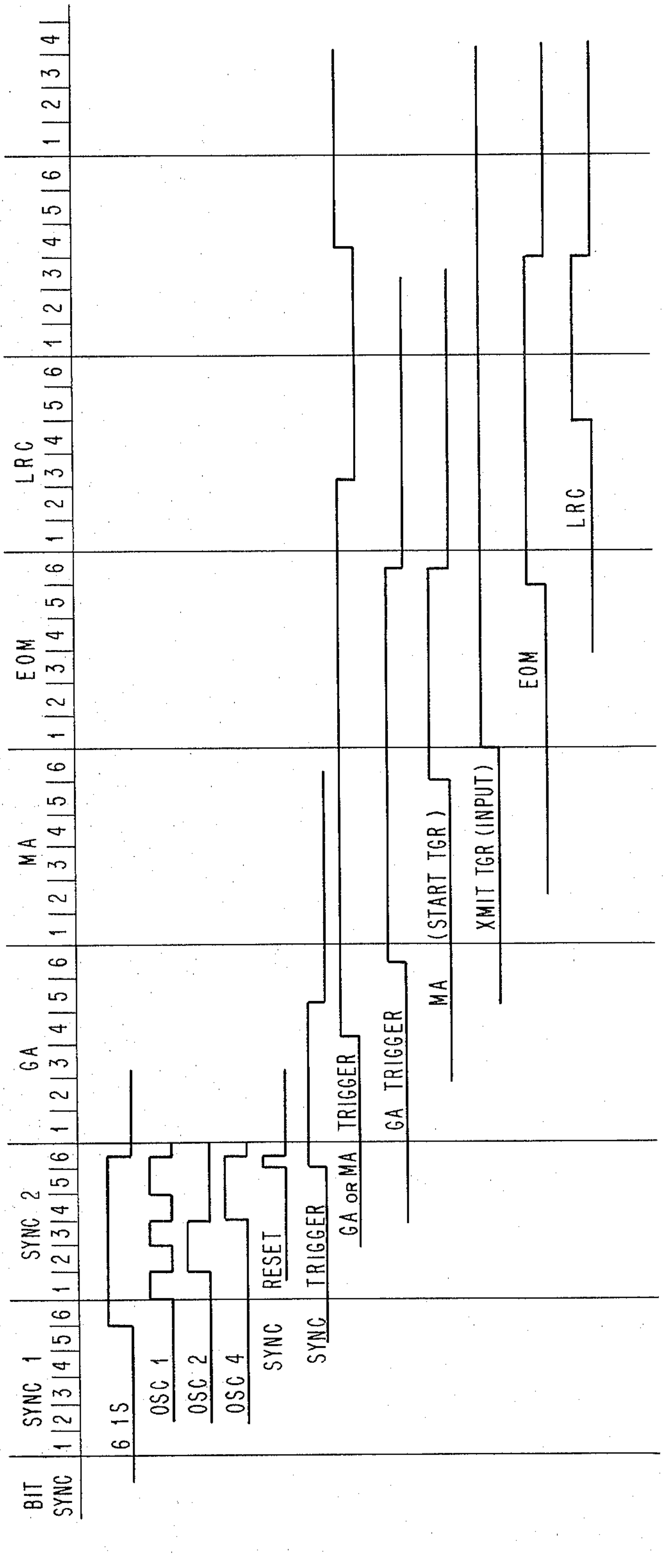
FIG. 5 represents a typical sequence of operations in the device of FIG. 2.

A typical message and character handling sequence, in an Output Mulcom is indicated, with appropriate waveforms, in FIGURE 5.

*Character Recognition*

The Output Mulcom continuously monitors the output line 212 through the Subset 201 for messages and must recognize a number of control characters through the Character Recognition (CR) circuit 219.

*Synchronizing Character*

The Data Processing Center transmits all zero bits if it has no messages to be sent. The DPC then sends a Character Synchronization Group prior to sending the next message. The Character Synchronization Group enables the Output Mulcom to synchronize with the DPC.

*Character Sync.*—Character Sync is recognized through the use of a "Six 1's" trigger and an Output Sync Counter during the Sync 1 and Sync 2 character intervals, FIGURE 5.

*Go Ahead Characters*

This character may occur after a sync character group or an LRC character. Upon recognition of a sync group, a signal on the Sync reset line 217 in FIG. 2 sets the Sync trigger as indicated during the Sync 2 character interval in FIG. 5, and at the following T4 time, the Sync trigger gates setting of the Go Ahead or Mulcom Address (GA or MA) trigger, during the GA interval in FIG. 5. The GA or MA trigger is in the Character Recognition circuit 219. The GA or MA trigger remains set for a length of time which overlaps the GA trigger set time and the MA trigger set time. The GA or MA trigger comprises —TO blocks 1809 and 1810 in FIG. 18. The GA or MA trigger is also set at T4 time by a Mulcom Address character following the LRC, after it is conditioned by the EOM and LRC triggers being set. The GA or MA trigger is reset at the first T3 time after being set providing the GA trigger is reset. The GA trigger is also in the Character Recognition circuit 219. The GA trigger will be set by the recognition of the Go Ahead character, and the GA trigger being set prevents resetting of the GA or MA trigger until the T3 time after the GA trigger is reset. The GA trigger comprises —TO blocks 1911 and 1912 in FIGURE 19.

The GA trigger is reset at the T6B time following its set for Go Ahead messages that are intended for and recognized by other Mulcoms. For a Go Ahead message addressed to a particular Mulcom, the GA trigger reset is prevented by the Start trigger being set during the Mulcom Address (MA) character interval, but it is reset at T6B time after the reset of the Start trigger.

The GA or MA trigger being on conditions the recognition of the Go Ahead and Mulcom Address characters by the Output Mulcom and prevents their recognition at any other time. Receipt of the GA and MA characters by the Output Mulcom from the DPC will result in the transmission of messages by the Input Mulcom to the DPC.

*Mulcom Address (MA)*

Output Mulcoms interpret the first character following LRC or a Character Synchronization Group as a preassigned Mulcom Address (MA) character.

Figure 18:
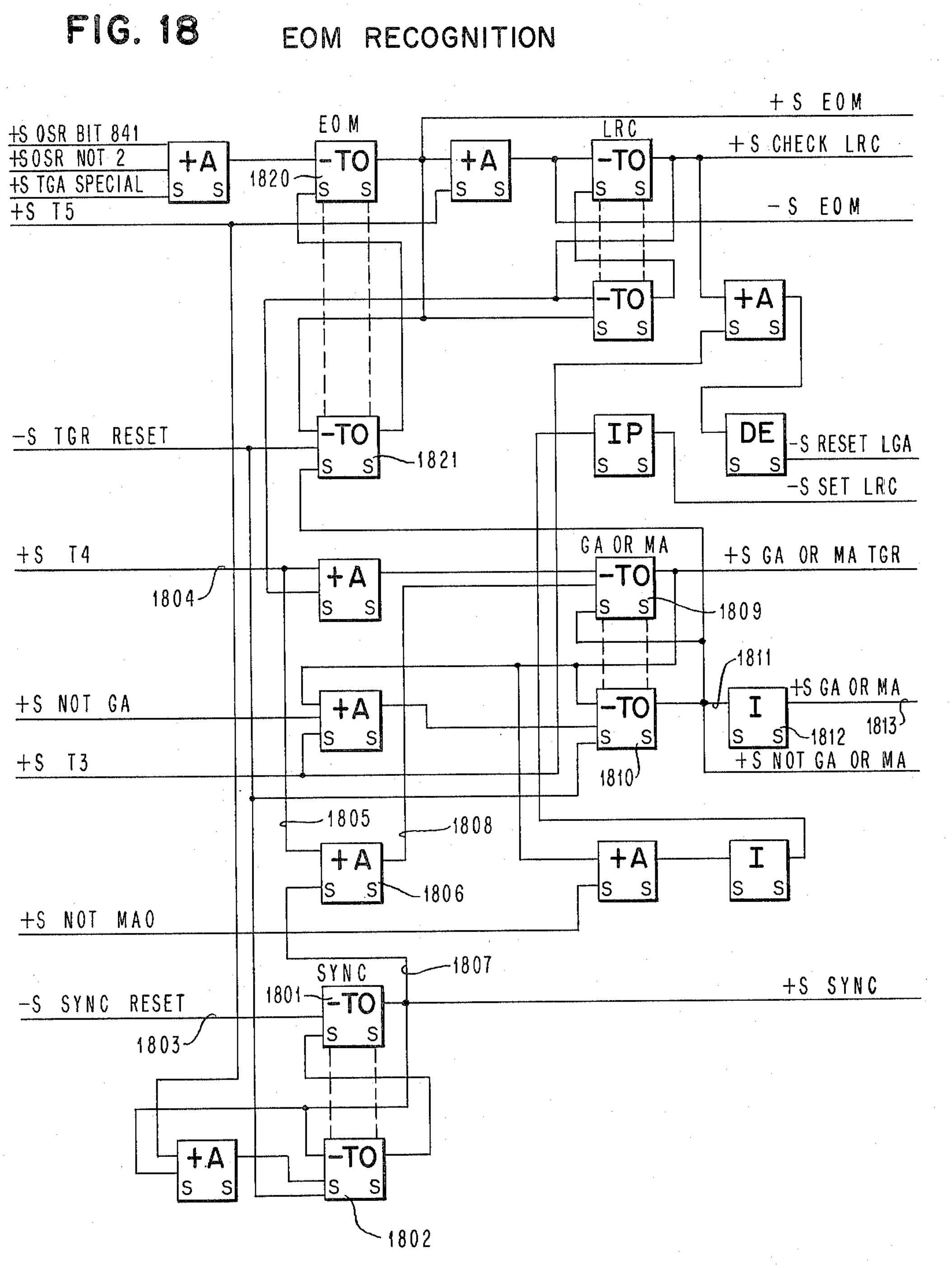
FIG. 18 is a character recognition circuit in the equipment of FIG. 2.

The assigned MA is recognized only after a Sync group, a GA character, or an LRC character, recognition being dependent upon the GA or MA trigger, FIG. 18, being set.

If the GA character was previously received, recognition of the asigned MA character allows turning on of a Start trigger in the Character Recognition circuit 219 at T6A time, during the MA time interval in FIG. 5. The Start trigger comprises —TO blocks 1927 and 1928 in FIG. 19. For a Go Ahead message, the output of the Start trigger is ANDed with that of the GA trigger to condition the Input Mulcom Monitor-Transmit (MT) trigger for setting on the next rise of the 1 kc. clock pulse at T1 time of the EOM character interval in FIG. 5. The MT trigger comprises the blocks 2002 and 2003 in FIG. 20. The output of the Transmit trigger gates resetting the Start trigger at the following T6B time. The Start trigger being reset allows the same T6B pulse to reset the GA trigger, FIG. 19. The Start trigger receives a reset pulse every T6B time when the Input Mulcom is in Transmit mode.

For a data or control message, the output of the Start trigger is ANDed with the GA trigger being in a reset condition to turn on the MAO trigger, which comprises —TO blocks 1940 and 1941 in FIGURE 19.

The output of the MAO trigger resets the Start trigger. However, the Start trigger output is held conditioned for the duration of the T6A pulse by the set input. The Start trigger output is conditioned during T*A time for data and control messages.

Selection of Output Mulcom OM portions and Terminal Sets for output messages has no fixed sequence. They are randomly addressable and sequence of selection is determined by the program at the Data Processing Center. Output messages originating at the Data Processing Center are available to all Output Mulcoms. However, only the addressed Mulcom actually accepts the message and presents it to a Terminal Set or acts upon it.

*Terminal Address*

In an output data message, the character following a Mulcom Address (MA) character is interpreted as a Terminal Set Address (TA) character.

For a data message, the MAO trigger, FIG. 19, being set, the GA or MA trigger, FIG. 18, being reset, and the following character having a zero in the OSR "8" position allows the Select trigger to be set at T6A time, indicating that a TA character is in the OSR. The Select trigger comprises —TO blocks 1942 and 1943 in FIG. 19. The same conditions that set the Select trigger also condition the Set TA line 218 in FIG. 2 to set the TA character contained in the OSR into the Terminal Address Encoder register 208.

The output of the Select trigger gates resetting of the MAO trigger at the following T3 time.

*End of Message (EOM) Characters*

Any of four End of Message (EOM) characters are recognized whenever they occur in an output message and an EOM trigger is set at T6A time. The EOM trigger comprises —TO blocks 1820 and 1821 in FIGURE 18. The EOM trigger being on gates setting of the LRC trigger at the following T5 time. The LRC trigger comprises —TO blocks 1822 and 1823 in FIG. 18. At the T4 time following setting of the LRC trigger, the GA or MA trigger, FIG. 18, is set to allow recognition of the character being assembled as a GA or MA character. Should no message follow the message just received (a period of data inactivity) the GA or MA trigger will be reset and then be set again upon recognition of a Sync group.

Setting of the GA or MA trigger resets the EOM trigger and resetting of the EOM trigger resets the LRC trigger.

At T3 time of the charatcer following the LRC, the LRC trigger conditions the Terminal Address Register for resetting.

The LRC trigger being on gates the ORed outputs of the LRC register and at T2 time of the character following the LRC, a set-conditioned output from any LRC register trigger indicates an Output Parity error.

*Longitudinal Redundancy Check (LRC) Character*

All output messages terminate with the Longitudinal Redundancy Check character (LRC). Output messages can follow each other without a break, that is, the Mulcom Address character of one message can immediately follow the LRC character of a previous message.

*Input Mulcom IM*

A block diagram of the Input Mulcom Logic is shown in FIGURE 6. This diagram is generally applicable to all of the Input Mulcoms IM in FIGURE 1, except the Input Mulcom for the most remote Mulcom M1, which ordinarily would not have the Subset demodulator 606, the Go Ahead Recognition Circuit 611 and related circuits. In the system discussed herein, the Input portion for Mulcom M1 is activated only by a Go Ahead message from the DPC through its associated Output Mulcom. This is true because Mulcom M1 is the most remote on the line, and no need exists for the demodulator and GAR circuits found in the other Mulcoms nearer the DPC.

From the diagrammatic representation of FIG. 1, it will be realized that transmission of information from terminals T1–T3 to the DPC through the Input Mulcom portion of Mulcom M1 is initiated under control of signals sent from the DPC over line 102 through the Output Mulcom portion of Mulcom M1 and over line 103 to the MT circuit of Mulcom M1.

As will be discussed in greater detail shortly, addressing of Mulcom M2 and Mulcom M3 may be accomplished either directly under control of the Data Processing Center DPC over lines 102 and 104 or 106 respectively, or addressing of the Mulcoms M2 and M3 may be initiated as a result of impulses established on the input line 101 by a more remote Mulcom as received in the GAR circuits of M2 and M3 over the control lines 105 and 107, respectively.

Each of the Input Mulcoms IM has a Monitor-Transmit (MT) control circuit which controls the access of the Input Mulcom to the line 101.

It will be seen that the MT portion of Mulcom M1 has a control line 103 directed to it from a Character Recognition Circuit (CR) in the associated Output Mulcom OM. The MT circuit of Mulcom M2 however, is controlled either from the CR circuit of its associated Output Mulcom on line 104 or from an internal Go Ahead Recognition (GAR) circuit 109 on line 113. The MT circuit of Mulcom M3 is controlled like that of Mulcom M2 from the CR circuit of M3 on line 106 or the GAR circuit 111 of M3 on line 112.

The Input Mulcom contains two registers: Input Shift Register (ISR) 601 and Longitudinal Redundancy Check Register (LRC) 603; as well as three counters (Scanner 602, Sync Counter 604, and Bit or Parity Check Counter 605). All Input Mulcom operations are accomplished by counting, switching, decoding and sequential stepping operations.

Control and data pulses encountered in the Input Mulcom are shown in FIG. 7. These include the data pulse configurations present during a monitor condition and during a transmit condition, the 1 kc. and 2 kc. clock pulses, the T1–T6 bit pulses which correspond to the B-A-8-4-2-1 bits of a character, and the T1 Special pulse. Also shown are the T1 Read pulses 701 and 702, and the pulses 703–708 for shifting data bits through the Input Shift Register. In addition, a T6 Special pulse comparable to that in the Output Mulcom is available. Some of the control signals are inverted to form Inverted Pulses (IP), as required.

*Clock Pulses*

The Input Mulcom receives three different clock pulse inputs and has one self-generated clock pulse (for Off-Line operation) from which the timing and conntrol pulses are generated, as follows:

(1) *1 kc. Clock.*—Clock pulses at a one kilocycle rate are received from the Subset modulator-transmitter to turn on the Transmit trigger coincident with the rise of the 1 kc. clock. No other operation is performed by the 1 kc. clock.

(2) *2 kc. Clock.*—Clock pulses are available from the Subset modulator and the Subset demodulator to control Mulcom operations, the one used being determined by the mode of operation.

(3) For Off-Line operations, a self-contained 2 kc. multivibrator supplies the clock pulses for Input Mulcom operations.

*Input Messages*

The format of input data messages is Mulcom Address, Terminal Address, Body, EOM and LRC. A Character Synchronization Group precedes the first input data message.

The Input Mulcom generates the first two characters of an input data message. If first transmits its own unique Mulcom address. Then it sends the Terminal Set address of the selected terminal.

The Body of the message and the EOM character are generated by the selected Terminal Set. Data is transferred from the selected Terminal Set to the Mulcom in seven bit characters under control of timing pulses on the timing line 640 in FIG. 6. Timing of data transfer is such that no delay occurs between the Terminal Set Address characters and the Body of the message. There are also no delays between subsequent messages from the same Mulcom.

The seventh bit of all characters sent from Terminal Set is a check bit (C). The Mulcom performs a parity check on each accepted character and then drops the parity bit when the data is sent to the Digital Subset modulator. If a parity error is sensed, the Terminal Set is notified by raising the Input Parity Error line 641 in FIG. 6, which corresponds to line 811 in FIG. 8. The message being transmitted is then terminated.

In addition to being transmitted, all address and message characters enter an LRC generator or register 603. The Mulcom transmits an even parity LRC character immediately following the End of Message (EOM) character.

If a parity error occurs or if an output message addressed to a transmitting Terminal Set is detected, the Mulcom terminates transmission from the transmitting Terminal Set and sends a self-generated End of Message (EOM) character and then an LRC.

After transmission of all of its Terminal Set messages, the Mulcom will transmit a Go Ahead message. The Mulcom sends no further messages until it again detects a Go Ahead message containing its address in either the Input Mulcom or Output Mulcom.

The Input Mulcom sends messages to the subset modulator in a serial by bit, serial by character mode. The Input Mulcom provides 6 bits of storage since it receives data a character at a time from its Terminal Sets, and drops the check bit.

The Input Mulcom operates in either the Monitor or Transmit mode. When it is in the Monitor mode, the Input Mulcom is monitoring the line 613 in FIG. 6, for a Go Ahead message. The line 613 corresponds to the Input line 101 in FIGURE 1. When it is in the Transmit mode, the Mulcom is scanning its Terminal Sets and transmitting input messages. Usually, only the most remote Mulcom, such as Mulcom M1 in FIG. 1, receives its Go Ahead as an output message from the Data Processing Center. The message is transferred from its output section to its input section to change the Mulcom status from a Monitor mode to a Transmit mode. However, this sequence could be used for any Mulcom on the line. Under ordinary circumstances, it is only used for the most remote Mulcom.

*Monitor Mode*

Bits received by the Subset 606 are transferred to the Input Shift Register 601 (ISR) when in Monitor mode. As each bit arrives, 2 kilocycle (*kc.*) clock pulses from the receiving Subset on lines 607 and 608 shift the present data one position and set the new bit into the first or "1" position of the Input Shift Register 601.

As each more remote Mulcom turns on its transmitter and sends character sync, it is recognized by the Sync Decoder 609 and the timing controls are reset by a signal on line 610 to achieve character synchronization with the transmitting Mulcom.

When a Go Ahead character is recognized, the output of the ISR 601 is gated to the Go Ahead Recognition (GAR) circuit for activating the Mulcom. When activated, the Mulcom enters the Transmit mode. Monitor data is then prevented from entering the ISR.

*Transmit Mode*

When a Mulcom is addressed by a Go Ahead message, the Transmit trigger is turned on and the Sync 1 and Sync 2 characters are generated and transmitted. The Monitor-Transmit (MT) trigger 628 is turned on by a 1 kc. clock pulse, if a +S Start level is available from the —OR block 626 on line 627.

Upon entering the transmit mode, a Request To Send signal is sent to the transmitter in the Subset, by a signal on line 612. The transmitter is turned on and starts sending bit sync on the input line 613, FIG. 6, which corresponds to line 101 in FIG. 1.

A Clear To Send signal is received from the Subset on line 614 in a typical system, about 8.5 ms. after the Request To Send signal is sent, and the first group of character sync, from the Sync Generator 604 is gated through Message Assembly 615 to the ISR. The 2 kc. clock pulses on line 616 from the transmitter, shift the information in the ISR as each bit is transmitted from the "B" position. As the last of the six bits are transmitted, the second sync group is set into the ISR. When a Sync 2 trigger in the Sync Generator 604 is turned on, the Terminal Set Scanner 602 is started by a pulse on line 617.

Each Terminal Set decodes the output of the Scanner 602 on the ten address lines and, if it is currently requesting service when its address is decoded, the TS Selected line 618 is raised to stop the Scanner 602 via line 619 with the address of the selected Terminal Set remaining in the Scanner.

The Message Format Generator 620 resets the LRC Register 603 and sets the Mulcom Address (MA), the Terminal Address (TA—from the scanner on line 621), and the data from the Terminal Set on six data lines 1-2-4-8-A-B in a data bus 643 into the ISR a character at a time, parallel by bit. The "C" bit of each character passes through an AND gate 622 to the Parity Check Counter 605.

The End of Message (EOM) character in the message from the Terminal Set is recognized when it is sent into the ISR, through the EOM decoder 623, and restarts the Scanner 602. A Longitudinal Redundancy Check Character is developed for each message and is set into the ISR after the EOM character is handled by signals on a bus 624.

The Scanner 602 when stepped from a count of 31 to zero, signals the end of a scan and causes the Go Ahead character to be transmitted through the Send GA circuit 625 after the previous LRC character. The Mulcom is returned to Monitor mode by a delayed signal on line 644 after the Go Ahead character is transmitted.

Immediately after transmission of its Go Ahead message, the Input Mulcom drops the Request To Send line.

*Input Timing 645*

Timing for transmitting the six bits of each character is established by a three-stage binary count-up counter, which is included within the Timing Controls block 645. When the bit timing counter contains a count of six the next stepping pulse turns on the "one" trigger and resets the "two" and "four" positions. The counter thus counts only to six and then starts over. The counter is comparable to the output timing counter, comprising TV blocks 1701–1706 in FIGURE 17.

The outputs of the counter are designated T1 through T6 pulses, each pulse having a duration of 500 $\mu$sec. The pulses are derived from various combinations of the trigger outputs. The T1 and T6 special pulses are special in that the beginning of the pulse is delayed 20 $\mu$sec. and the ending advanced 80 $\mu$sec., making their duration 400 $\mu$sec. These special pulses prevent close timing conditions. The counter is stepped by 2 kc. stepping pulses, as determined by the mode of operation.

The counter is reset to T6 time by recognition of the Sync 1 and Sync 2 characters when in Monitor mode, and is stopped and held at T5 time by the Reset line at the start of Transmit mode. The Reset line goes negative when the Clear To Send line from the Subset is raised, and allows the next clock pulse to step the counter to T6 time.

An ISR shift pulse occurs at the end of the timing pulse (within the last five $\mu$sec.). The shift pulse occurs at the end of T5 time and results from the rise of the clock pulse which steps the counter to T6 time, and the circuit delay before the T6 line falls.

A T1 Read pulse, such as the pulse 701 in FIGURE 7, is generated at the end of T6 time. The clock pulse stepping the counter from T6 to T1 is gated through a Sample Pulse Driver (DSP) before the T6 line falls, due to circuit delay between the counter and the T6 line.

During Monitor operations, the ISR shift occurs at every T-time to shift the data through the ISR. During Transmit operations, the shift pulse at the end of T6 time is inhibited and the T1 Read pulse is generated to read a character into the register, all bits in parallel.

*Input Shift Register (ISR)*

The Input Shift Register 601 (ISR) is a six-position trigger register which has both serial and parallel inputs and outputs. The serial input is to position "1" where Monitor data bits are entered. The serial output is from position "B," where data bits are gated to the transmitter 629 for the input line 613. Six-bit characters are entered in parallel from the Terminal Set through Message Assembly 615 when sending an input message. Parallel outputs from the six positions are continuously decoded to recognize the presence of a control character in the ISR.

The register shifts at a 2 kc. rate, bits moving from the "1" toward the "B" position. During monitoring, data is set into the "1" trigger by a 2 kc. clock line and the rest of the register simultaneously shifted by an ISR shift line. During Transmit operations, the six-bit character is set into the ISR by the Read T1 pulse at the very end of T6 time and shifted by the ISR line at the end of T1 through T5 times.

*Input Message Assembly*

The Message Assembly circuit 615 provides input switching to the ISR and gates the data and control characters to be set in the ISR in the proper sequence. Each input is gated through the Message Assembly at the proper time and is set into the ISR by the T1 Read pulse. The Input Message Assembly is shown in greater detail in FIG. 21.

*LRC Register*

The LRC circuit 603 is a six-position trigger register with each position having a binary input. The output of the ISR is set into the LRC register at the end of T1 time of each character cycle just before the ISR is shifted. The LRC register is reset at T6 time of the Sync 2 or LRC character if the next character to enter the ISR is the MA character of an input message.

The LRC is the next character gated to the ISR upon recognition of an EOM character. Characters entered in the LRC register, such as Sync or Go Ahead characters, are reset when the MA character is to be sent; and their transfer to the register has no effect on the transmitted LRC character.

*Terminal Set Scanner*

The Terminal Set Scanner 602 is a five-position binary count-up counter that generates decimal addresses 0 to 31. Each Terminal Set connects to five of the ten output lines for address recognition. The counter is stepped by an 8 kc. multivibrator (MV) 632 that is controlled by the Scan Trigger 634 and the TS Selected line 618.

The Scan trigger going on starts the multivibrator 632, which steps the Scanner. The output of the multivibrator (inverted), ANDed with the TS Selected line, resets the Scan trigger 634 during the negative excusion of the in-phase MV pulse, if the TS Selected line comes up.

When the Scanner contains a count of 31, the next pulse ripples the counter to all zeros. The high order "16" trigger going off turns on the Send GA trigger in the block 625. The Send GA trigger going on resets the Scan trigger, leaving the Scanner reset (all zeros).

*Character Recognition*

The output of the Input Shift Register is continuously sampled for the recognition of the following control characters:

*Character Sync*

The Sync Recognition circuits 609 continuously decode the ISR outputs. A Six 1's trigger is provided in the circuit 609, which is turned on whenever the ISR contains all ones. The Six 1's trigger being ON, and the ISR "1" position containing a one, conditions the Sync Counter, which is a three-position binary count-up counter, and which is also in the circuit 609. The circuit 609 is shown in greater detail in FIG. 16. When the Sync Counter contains a count of five, as a result of the ISR receiving 5 ones in a row, and the next bit in the IRS "1" position is a zero, the Sync Reset line resets the Bit Counter to T6 Time. A count of five will remain in the Sync Counter (stepping is inhibited) until a zero is read into the ISR. The inverted delay (ID) 2 kc. clock pulse, and ISR "1" position being Not One resets the Six 1's trigger. The Six 1's trigger going off holds the Sync Counter triggers reset. The above circuit can recognize Character Sync only when in the Monitor mode. So, the ISR "1" position must contain a one bit for five shifts after the Six 1's trigger is turned on (to step the Sync Counter). When transmitting, the first shift after a character is set into the ISR leaves the ISR "1" position a zero.

*Go Ahead*

The outputs of the ISR are sampled by the Go Ahead Recognition (GAR) circuit 611 every T6 time to recognize the presence of a Go Ahead (GA) character. Sampling at T6 time limits the GA recognition to Monitor mode, since the ISR will contain at least five zeros (positions 1 through A) at T6 time when transmitting. This prevents recognizing some combination of two other characters as a Go Ahead when monitoring. At the T6 time following that of Go Ahead recognition, the next character not a GA character and the T6 pulse gate the GA trigger output to condition the New Sync line 803 to the Subset. The rise of T6 time occurs 20 $\mu$sec. after the rise of an in-phase clock pulse. The GA trigger is reset by the rise of the inverted clock pulse, giving a 230 $\mu$sec. pulse (since the T6 rise is delayed) on the New Sync line. The GA trigger receives a reset pulse at every T6 time except the one when a GA character is recognized. The GAR circuit is shown in greater detail in FIG. 10.

*End of Message (EOM)*

The four types of EOM characters have identical 8, 4, 2, and 1 bit configurations as shown in Table I above. These four bits are used for EOM recognition, but are not decoded until they are shifted to the BA84 positions of the ISR. These IRS outputs are used to turn on the Send LRC trigger at T3 time when transmitting data. T3 time is when the original 8, 4, 2, 1 bits have been shifted to the BA84 positions.

The Send LRC trigger gates the generated LRC character causing it to be the next character set into the ISR after the EOM.

Since the EOM set into the ISR could have been an EOM from the Terminal Set or a Mulcom-generated EOM, the Reset EOM line goes to reset the Send EOM trigger should it have been on. A signal on the Restart Scan Line 645 turns on the Scan trigger 634.

Starting the Scanner (at the end of T3 time) gives T4–T6 time, plus the transmission time of the LRC character, for the Scanner to find the next Terminal Set requesting service or to determine that none require service.

The Send LRC trigger is reset at the first T2 time after it is turned on.

*Message Generation*

The non-data characters transmitted in input messages are generated within the Mulcom as follows:

*Character Sync*

Figure 20:
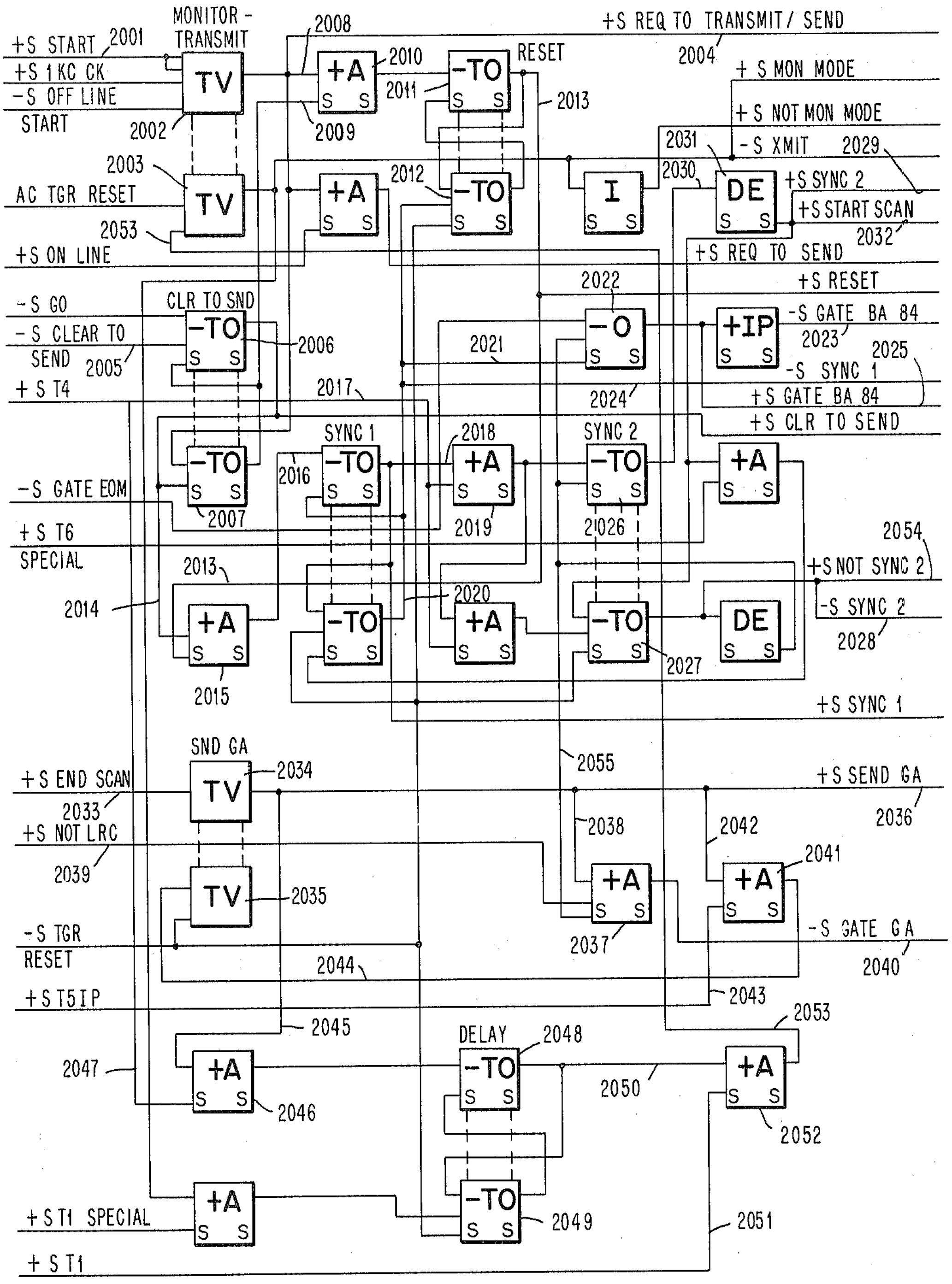
FIG. 20 is a control circuit in the input multiplexing equipment of FIG. 6.

The Clear To Send trigger, FIG. 20, being on, ANDed with Reset, turns on the Sync 1 trigger, FIG. 20. The output of the Sync 1 trigger gates the Sync 1 character (111111) to the ISR and turns off the Reset trigger, allowing the Bit Counter to step. The Sync 1 trigger output gates setting of the Sync 2 trigger, FIG. 20 at T4 time, during transmission of the Sync 1 character. The Sync 2 trigger gates the Sync 2 character (111110) to the ISR, and gates a T6 signal (while the last bit of the Sync 1 character is being transmitted) to reset the Sync 1 trigger, conditions the Start Scan line 2032 to turn on the Scan trigger 634, and an inverted Sync 2 line (2054, FIG. 20; 2202, FIG. 22) degates setting the Send MA trigger until after the Sync 2 character is transferred to the ISR. This prevents a TS Selected from setting the Send MA too soon, which would cause both the Sync 2 and MA to be gated to the ISR. The output of the Sync 2 trigger gates the next T1 pulse to reset itself.

*Send Mulcom Address*

The Send MA trigger, comprising —TO blocks 2207 and 2208, FIG. 22, is turned on at T6 time (during transmission of the Sync 2 character) if a Terminal Set has been selected. The output of the Send MA trigger gates the assigned MA character to the ISR, resets the LRC register and gates setting the Send TA trigger at the next T5 time.

The Send MA trigger reset is gated by the Send TA trigger being on at T5 time.

*Send MA Reset*

The Send MA Reset trigger, comprising —TO blocks 2205 and 2206, FIG. 22, prevents the Send MA trigger being turned on during data transmission. It is turned on at the same T5 time as the Send TA trigger and is reset by the Send LRC trigger being turned on.

*Send Terminal Address*

The Send TA trigger is set at T5 time during transmission of the MA character. The Send TA trigger comprises —TO blocks 2217 and 2218, FIG. 22. The output of the Send TA trigger conditions the Send MA trigger for resetting. The output also conditions the Data trigger, the Send MA Reset trigger at T5 time, and also gates the outputs of the five triggers in the Scanner 602 to the BA842 positions of the ISR thus generating the address character of the Terminal Set from which the message originated. The Send TA trigger is reset by the turning on of the Data trigger, FIG. 22 and T6 special time. The Send TA trigger going off resets the Parity trigger in preparation for the data character entering the ISR at T1 Read time.

*Data Trigger*

The Data trigger, comprising —TO blocks 2227 and 2228, FIG. 22, is turned on at T4 time, during transmission of the TA character, and remains on until an EOM, or a no-data condition, is recognized in the ISR. The outputs of the Data trigger conditions EOM recognition, gates a T6 timing pulse on line 2241 to the Terminal Set requesting a data character, and also gates the data lines to the ISR (and check bit to the Parity trigger), at T6 time.

The Data trigger is reset by the Scan trigger being turned on. This occurs upon recognition of an EOM character in the ISR indicating the last character of a data message.

*Message Incomplete*

Should a parity error occur in data being received from the Terminal Set, or should an output message interrupt the input message, the data transmission is terminated, and a special EOM character is set into the ISR for transmission.

An all-zero condition in the ISR, at T1 Special time, with the data trigger on indicates that some error, or an interrupted message, has occurred, and turns on the Send EOM trigger in the Special EOM circuit 646, FIG. 6. The condition of the Parity trigger in the circuit of 605, FIG. 6, is checked at each T6 time (Data trigger On) and, if On, the Send EOM trigger is turned On. The outputs of the Send EOM trigger gate the Special EOM character to the ISR, degate the Read Data line to prevent gating the data lines to the ISR, and condition the Input Parity alarm line to the Terminal Set. The Send EOM trigger is reset by the fall of the Reset EOM line upon recognition of any EOM character in the ISR.

*Send Go Ahead*

Completion of a Terminal Set address scan initiates a Go Ahead message to a less remote Mulcom or the DPC, by a signal on the line 647 to the Send GA circuit 625. Completion of a scan is recognized by the "16" position trigger of the Scanner going off. This may occur with from zero to 31 input messages having been transmitted.

The Send GA trigger, which comprises TV blocks 2034 and 2035 in FIG. 20, is set by the End Scan line going to a positive or +S condition. Outputs of the Send GA trigger resets the Scan trigger to stop the Scanner, gates the Go Ahead character to the ISR if the Send LRC trigger is not on.

The Send GA trigger is reset at the fall of T5 time.

*Delay*

The function of the Delay trigger, comprising —TO blocks 2048 and 2049, FIG. 20, is to control turning off of the Monitor-Transmit trigger. The Delay trigger is set at T4 time during transmission of the GA character. The output of the Delay trigger conditions the Monitor-Transmit trigger for resetting at the following T1 time. The Transmit trigger resetting gates resetting the Delay trigger at T1 Special time (20 μsec. later).

*Go Ahead Message from DPC to Mulcom M1*

There are two primary ways in which an Output Mulcom is activated. They are (1) recognition of a message from the DPC for one of the associated terminal sets and (2) recognition of a Go Ahead message from the computer which indicates that the Input Mulcom should begin sending messages from its associated Terminal Sets into the DPC.

A typical sequence of addressing operations will be described by discussion of the transmittal of a Go Ahead message from the DPC to the most remote Mulcom which is Mulcom M1 in FIG. 1. The Output Mulcom logic involved is shown in FIG. 2 and the signals encountered during operation of the Output Mulcom are shown in FIG. 5.

In FIG. 5, it will be noted that major time intervals are indicated from left to right across the top beginning with Sync 1 and ending with LRC. Each of the major time intervals is subdivided into six minor time intervals which correspond to the six bits of a character.

All data bits coming into the Output Mulcom through the Digital Subset Demodulator 201 arrive bit by bit and are shifted into the Output Shift Register 206, with the high order position of a character entering the shift register first.

The first message from the DPC is preceded by two characters of synchronization, that is Sync 1 and Sync 2. The Sync 1 time interval is referred to as the bit sync character while the Sync 2 time interval is referred to as the character synchronizing character. The Sync 1 character comprises six 1 bits while the Sync 2 character comprises five 1 bits and a zero bit. As can be seen in Table I above, a character which contains six 1's will not occur at any other time.

The detailed circuitry for recognizing the synchronizing characters is shown in FIG. 16.

When six 1 bits have been accumulated in the Output Shift Register 206, +S levels will exist in all positions of the register. These are applied to a +AND block 1601 and an Extender 1602 by way of lines 1603, 1604, 1605, and 1606 in FIG. 16. Two kc. timing pulses arrive at periodic intervals on the line 1607. On the next +S rise of the 2 kc. clock on line 1607, a —S level output will be developed on line 1608. This —S output is directed to the input of a Six 1's trigger which is comprised of two —TO blocks 1609 and 1610, corresponding to the —TO trigger of FIG. 13.

The +S output from the Six 1's trigger is directed to one input of a +AND block 1611.

Operating in conjunction with the Six 1's trigger is an Output Sync Counter OSC having three binary positions 1, 2, and 4, and comprising TV blocks 1612–1617 in FIG. 16.

As soon as the Six 1's trigger has been set by the recognition of six 1 bits, the output of the block 1610 becomes —S on line 1618. This is inverted in an Inverter 1619 and the signal is used on lines 1620, 1621, and 1622 to reset the three binary counter positions.

The trigger positions 1 and 4 of the binary counter are connected by lines 1623, and 1624 to a +AND gate 1625. Since the counter has been reset both of these lines to the +AND gate 1625 will be down or at a —S level and the output of the gate 1625 on line 1626 will be at a +S level. This is coupled on line 1627 to one input of the +AND gate 1611. The third input of the +AND gate 1611 is derived from the Output Shift Register bit 1 position which will be at a +S level so long as it has a 1 bit in it. This is on line 1628.

Since all inputs of +AND gate 1611 are at a +S level, its output on line 1629 is at a —S level. This is inverted in the block 1630 and directed on line 1631 to the upper input of a Sample Pulse Driver (DSP) 1632. Two kc. clock pulses with a +S level are directed to the lower input of the Sample Pulse Driver 1632 on line 1633. The output of the Sample Pulse Driver 1632 on line 1634 is directed to the low order position of the binary counter to step it once each time a 1 bit occurs in the bit 1 position of the Output Shift Register.

The Output Sync Counter will step in this manner during the Sync 2 time interval in FIG. 5 until it reaches a count of five. At this time, +S levels will exist on lines 1623 and 1624 to the +AND gate 1625. As a result, the output of +AND gate 1625 becomes a —S level, and drops one input of the +AND gate 1611 to stop further counting action. The output of +AND 1625 is inverted by the Inverter 1635 to a +S level on line 1636 to the +AND gate 1637. It will be recalled that the second character of synchronization should be five 1 bits and a zero bit. This is used in the circuit of FIG. 16, by directing the +S level OSR Not 1 from the Output Shift Register, bit position 1, to the center input of +AND gate 1637 on line 1638. The other input of the +AND gate 1637 is a 2 kc. clock pulse on line 1639.

The output of +AND 1637 becomes —S on line 1640 and after inversion becomes +S Sync Reset on line 1641. The +S Sync Reset level is used to obtain synchronization in the Output Timing Ring 204 in FIG. 2, which is shown in greater detail in FIG. 17. It comprises the TV blocks 1701–1706.

The —S and +S levels from the +AND gate 1637 in FIG. 16 on lines 1640 and 1641 are directed to FIG. 17. The +S Sync Reset level comes in on line 1707 and sets the T2 and T4 positions of the Output Timing Ring, so that it is sitting at T6 time. The —S level insures that the 1 position of the Output Timing Ring is reset on line 1708.

Another trigger of interest in the synchronizing action is shown in FIG. 18 and is referred to as the Sync trigger. It includes the —TO blocks 1801 and 1802.

In addition, the —S Sync Reset level from line 1640, FIG. 16, comes in on line 1803 in FIG. 18 to set the Sync trigger at the —TO block 1801, which then supplies a +S output on line 1807. The primary purpose of the Sync trigger is to indicate that the point in time has been reached when a Go Ahead character should be recognized.

In FIG. 18, when a T4 pulse arrives on line 1804 and 1805, the +AND gate 1806, having been conditioned by the +S level on line 1807 from the Sync trigger, will provide a —S output on line 1808.

The —S level on line 1808 results in the setting of the GA or MA trigger comprising the —TO blocks 1809 and 1810. The setting of the GA or MA trigger occurs during the GA time interval in FIG. 5. The —S level from the GA or MA trigger on line 1811 is inverted in the block 1812 to give a +S level on line 1813.

Referring to FIG. 19, a portion of the output control circuitry for the Output Mulcom is shown in some detail. As noted in Table I above, the six-bit configuration for the Go Ahead character is 001111 for the BA8421 positions, respectively. Arrival of the Go Ahead character in the Output Shift Register 206 of FIG. 2 will result in the application of +S levels on the lines 1901, 1902, 1903, and 1904. A +S level exists on line 1905 from terminal 1906 as a result of the GA or MA trigger having been previously set. This conditions five inputs of a +AND block 1907 and its Extender 1908 so that at T6B time, a pulse on line 1909 results in a —S level on line 1910.

The —S level on line 1910 sets the GA trigger which is comprised of —TO blocks 1911 and 1912. A +S level from the GA trigger on line 1913 conditions one input of +AND gate 1914.

Since this is a Go Ahead message from the Data Processing Center DPC, the next character coming in will be the Mulcom address. It will be assumed that the Mulcom address for Mulcom 1 is the letter G which has the bit configuration indicated below.

| B | A | 8 | 4 | 2 | 1 |
|---|---|---|---|---|---|
| 1 | 1 | 0 | 1 | 1 | 1 |

If this character configuration arrives in the Output Shift Register 206 of FIG. 2, +S levels will exist on the lines 1915, 1916, 1917, 1918, 1919, and 1920. The previous setting of the GA or MA trigger has resulted in a +S level on line 1921. Accordingly, at T6A time of the MA time interval indicated in FIG. 5, the contents of the Output Shift Register 206 are tested in order to determine if the Mulcom address for Mulcom 1 has been received.

With the Mulcom Address letter G in the Output Shift Register, the T6A pulse on line 1922 will result in all lines into the +AND 1923 and its Extenders 1924 and 1925 being at a +S level. A—S output on line 1926 will set the Start trigger which comprises the —TO blocks 1927, 1928, and the Extender 1929.

A +S level on the line 1930 from the Start trigger, in combination with a +S level on line 1913 from the GA trigger will result in the conditioning of the +AND block 1914 and this will provide a —S start impulse on the line 1931.

The —S start level on line 1931 is directed to a —OR circuit 1003 in FIG. 10 by way of line 1004. The output of the —OR 1003 is a +S start level on the line 1005.

Figure 9:
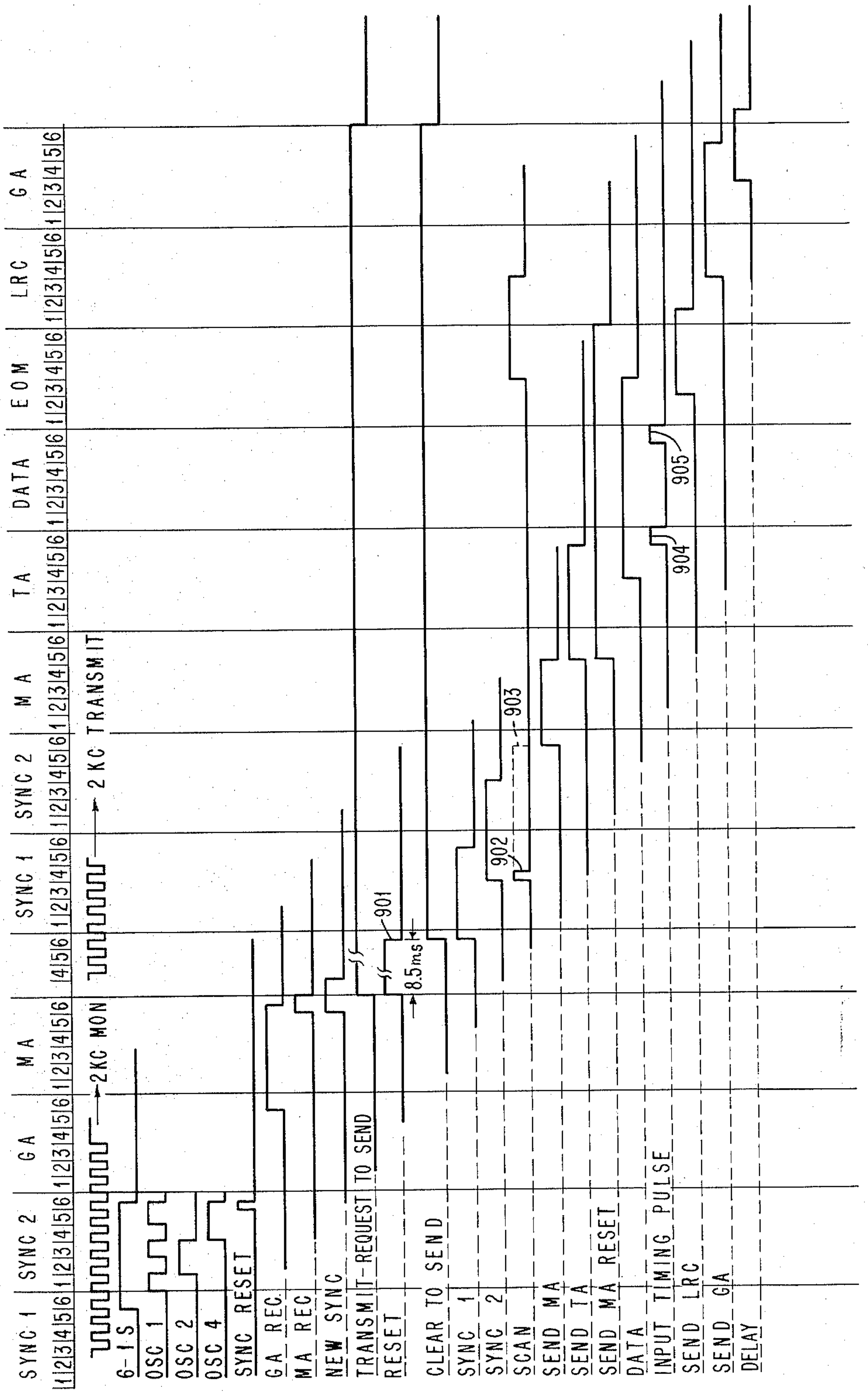
FIG. 9 is a graphical representation of a typical sequence of operations in the input multiplexing equipment of FIG. 6.

The —OR stage 1003 in FIG. 10 corresponds to the —OR stage 626 in FIG. 6 while the +S start level on line 1005 in FIG. 10 corresponds to the +S start level on line 627 in FIG. 6. The +S start level on line 627 results in setting the Monitor-Transmit trigger 628 into a Transmit condition. As a result of the Monitor-Transmit trigger being set, an impulse is directed on line 612 which is a Request to Send that is recognized by the Sunset modulator 629. In response to the Request To Send impluse, the Subset Modulator 629 returns a Clear To Send impulse as indicated in FIG. 8 on the line 808. The Clear To Send impulse from a Subset Modulator, in a typical case, would be returned some time after the Request To Send and as shown in FIG. 9, this time interval is 8.5 milliseconds. This is represented by the wave form 901.

The detailed input control circuitry is shown in FIG. 20. The +S Start impulse is directed to one input of the Monitor-Transmit trigger in FIG. 20 on line 2001. The Monitor-Transmit trigger comprises two TV blocks 2002 and 2003. The output of the Monitor-Transmit trigger on line 2004 is the Request To Transmit or Send Signal that is directed to the Subset modulator. The Clear To Send impulse from the modulator is a —S level on line 2005. The receipt of the Clear To Send signal on 2005 sets the Clear To Send trigger comprising —TO blocks 2006 and 2007.

The output of the Monitor-Transmit trigger on line 2008 and the output of the Clear To Send trigger on line 2009 into a +AND gate sets a Reset trigger which comprises —TO blocks 2011 and 2012.

It will be seen by reference to FIG. 9 that a Sync 1 and a Sync 2 character are sent over the line by the Input Mulcom as a result of a Clear To Send signal being received from the Subset modulator. This is shown in detail in FIG. 20. The output of the Reset trigger on line 2013 in conjunction with theoutput of the Clear To Send trigger on 2014 condition the +AND gate 2015 which sets the Sync 1 trigger on line 2016.

At T4 time of the following cycle, the T4 impulse on line 2017, together with the output of the Sync 1 trigger on 2018, condition the +AND gate 2019 to set the Sync 2 trigger. The fall of the down side of the Sync 1 trigger on line 2020 resets the Reset trigger. This same output on line 2021 through a —OR stage 2022 results in a —S gate BA84 on line 2023.

Referring to FIG. 21, the —S gate BA84 from line 2023 of FIG. 20 comes into a —OR block 2101 on the line 2102. The same —S impulse goes into an Extender 2103 on line 2105. Extender 2013 is connected to a —OR block 2104. The —S impulse is also directed by way of line 2106 to a —OR block 2107.

The Input Message Assembly circuitry in FIG. 21 is used for inserting particular characters into the Input Mulcrum Shift Register at the appropriate time. The Sync 1 character, 111111, is set up in the following manner. The output of the —OR block 2104 and its Extender 2103 results in a +S level on the line 2108 which is +S input bit B. The output of the —OR stage 2101 on line 2109 results in a +S level on the line labeled +S input bit 8. In addition, an output from the —OR stage 2107 on line 2110 gives a +S input level on the +S input bit 4 line. The —S level line 2024 in FIG. 20, or —S Sync 1 comes in on line 2111 in FIG. 21 through an Extender 2112 associated with the —OR block 2113 to provide a +S level on the line 2114 for bit 1 position. In addition the +S gate BA84 on line 2025 FIG. 20, is directed into a +AND gate 2115 in FIG. 21 by way of line 2116. The other input to this +AND gate, line 2117 will be at a +S level at this time since this is not an End of Message character. The output of the +AND gate 2115 through a —OR stage 2118 results in a +S level on the input bit A line 2119. The —S Sync 1 level by way of line 2120 through an Extender 2121 associated with the —OR block 2122 gives a +S level on the +S input bit 2 position line 2123. All input bit lines BA8421 are now +S.

The +S levels in FIG. 21 are directed to the respective inputs of the Input Shift Register 601 in FIG. 6 and the following T1 read pulse, shown as pulse 701 in FIG. 7 will result in loading the Character Sync 1 character which comprises a 1 bit in all positions BA842 and 1.

The Sync 1 character is provided bit by bit to the Subset modulator 629 over a line 648 and through a +AND gate 630 and a line 631, in FIG. 6.

The output of the +AND gate 2019 at T4 time of the Sync 1 cycle results in setting the Sync 2 trigger comprising —TO blocks 2026 and 2027. This, in turn, results in loading of the Sync 2 character by way of the —S levels on line 2028 and the +S level on line 2029 through the Input Message Assembly in FIG. 21, and the Input Shift Register 601 in FIG. 6. The output of the Sync 2 trigger on line 2030 is directed through an emitter follower (DE) block 2031 to initiate a scan of the Terminal Sets connected to this Mulcom by way of a +S Start Scan pulse on line 2032 in FIG. 20. The scanning takes place as represented by the wave form 902 and the dashed wave form 903 in FIG. 9. The Terminal Address Scanner 602 in FIG. 6 is stepped by an 8 kc. multivibrator 632 through a +AND gate 633 as a result of the setting of the Scan trigger 634 and further as a result of the aforementioned +S Start Scan impulse from line 2032 in FIG. 20, which corresponds to the line 617 from the Sync Generator 604 in FIG. 6.

The various Terminal Sets connected to Mulcom M1 will be addressed in sequence on the 10 address lines from the scanner 602. When a particular terminal that is being addressed requires service, this will be recognized by a return impulse on line 618 into the Message Format Generator 620. This also results in stopping the Scan trigger 634 by way of line 619.

The Message Format Generator is shown in greater detail in FIG. 22. If a Terminal Set requires service, the +S level indicating this comes into the Message Format Generator in FIG. 22 on line 2201. A +S Not Sync 2 level on line 2202, and a +S T6 special impulse on line 2203 in connection with a +S level on line 2204 from the Send Mulcom Address Reset trigger comprising —TO block 2205 and 2206, results in setting the Send Mulcom Address Reset trigger comprising blocks 2207 and 2208. The output of the Send Mulcom Address trigger on line 2209 through a Power Inverter IP 2210 on line 2211 results in gating the Mulcom Address which is simply provided through a control panel or paddle that is prewired. This Mulcom Address is loaded into the Input Shift register during the MA time interval in FIG. 9. The offside of the Send Mulcom Address trigger on line 2212 which is now at a —S level is inverted in the Inverter 2213 to a +S level that is applied on line 2214 to a +AND gate 2215. A +S level at T5 time of the following cycle on line 2216 results in setting of the Send Terminal Address trigger comprising —TO blocks 2217 and 2218 by way of line 2219. At T1 time the +S Gate Terminal Address on line 2220 which is directed to the Terminal Address scanner results in loading of the Terminal Address into the Input Shift register. This is then shifted out onto the line during the TA time interval in FIG. 9. The Send Mulcom Address trigger is reset as a result of an output from +AND 2221 on line 2222 at T5 time.

At T4 time of the TA time interval, a +S level from a Power Inverter 2223 on line 2224 and a T4 clock pulse on line 2225 into a +AND gate 2226 results in setting a data trigger comprising —TO blocks 2227 and 2228 by way of line 2229. The —S side of the data trigger on line 2230 through a Power Inverter 2231 gives a +S Data level on the line 2232. The same output from the Power Inverter 2231 is directed into one input of a +AND gate 2233 by way of line 2234. A +S Not Send EOM level on line 2235 and a T6 clock pulse on 2236 conditions the +AND gate 2233 to provide an output through an Inverter 2237 and another Inverter 2238. The output from inverter 2237 after further inversion results in a —R Read data pulse on the line 2239. The output of the Inverter 2238 through a Power Driver DP 2240 gives a +S Input Timing Pulse on a line 2241.

The —R Read data line 2239 corresponds to the line 635 in FIG. 6. The +S Input Timing line corresponds to the line 640 in FIG. 6. These are used to set the terminal in Read status and to gate significant characters, from the selected Terminal Set through Message Assembly 615 into the Input Shift Register 601.

The character bits that are presented on the lines from the selected Terminal Set are placed there as a result of the +S input timing on line 2241, FIG. 22, gating out each character in succession from the selected Terminal Set at T6 clock time as a result of the T6 clock pulses on line 2236. These T6 clock pulses correspond to the input timing pulses 904 and 905 in FIG. 9.

A selected Terminal Set will supply an End of Message (EOM) character at the end of the message. It is assumed that the End of Message character in this case is a 4, $\overline{8}$, an A, and a B. Occurrence of this bit configuration in the Input Shift Register results in +S levels being applied to the lines 2242–2245 in FIG. 22. The previously established +S data level on line 2246 results in the conditioning of all inputs of the +AND 2247 and its Extender 2248 so that the Send LRC trigger comprising —TO blocks 2249 and 2250 is set by way of line 2251. The same output on line 2252 results in a +S Restart Scan being directed to the Scan trigger 634 to start the Terminal Set Scanner ring again. The —S side of the Send LRC trigger after inversion in the Power Inverter 2253 is a +S Gate LRC on line 2254 which results in loading the current count of the LRC register 603 in FIG. 6. The LRC register 603 maintains a sum modulo two count of all bit positions in the characters of a particular message from a selected Terminal Set as they pass through the Input Shift Register.

If another Terminal Set requires service, a sequence of events will occur which is similar to that just described. Assuming that no further sets require service, the Terminal Address Scanner 602 will count to its limit which is assumed to be a count of 31. At this time, the Scanner will provide a +S End Scan impulse which is supplied on the line 2033 in FIG. 20 to set a Send Go Ahead trigger comprising TV blocks 2034 and 2035. A +S level from the Send Go Ahead trigger on line 2036 results in stopping the Terminal Set Scanner. The same +S level is applied to one input of a +AND gate 2037 on line 2038. Another input to this +AND gate 2037 is a +S Not LRC line 2039, and still another input is a +S level from the offside of the Sync 2 trigger by way of line 2055. The —S Gate Go Ahead line 2040 will become effective as a result of the +AND 2037 being conditioned. The —S Gate Go Ahead will bring up the proper lines in FIG. 21 for inserting the Go Ahead character into the Input Shift Register at the following T1 time in a manner similar to that described for loading the Sync characters.

Another +AND gate 2041 is conditioned at one input on line 2042 by the output of the Send Go Ahead trigger and on another input by a later arriving T5 clock pulse on line 2043. The output of this +AND 2041 on line 2044 resets the Send Go Ahead trigger.

The output of the Send Go Ahead trigger, while set, by way of line 2045 into a +AND 2046 and in conjunction with a T4 pulse on line 2047 sets a Delay trigger comprising —TO blocks 2048 and 2049. The purpose of the Delay trigger is to insure that the Input Mulcom will remain in a Transmit mode for sufficient length of time to insure that all characters that should have been transmitted are transmitted. The output of the Delay trigger, which has a delay of about 2 milliseconds, on line 2050, in conjunction with a T1 pulse on line 2051, conditions a +AND gate 2052 to provide a Reset pulse on line 2053 to the Monitor-Transmit trigger in FIG. 20.

A complete sequence for the Mulcom M1 has now been completed as a result of the receipt of the Go Ahead message from the DPC.

*Go Ahead Message Mulcom to Mulcom*

It is now necessary that the other Mulcoms M2 and M3 be interrogated for messages that their Terminal Sets might have.

Each Mulcom in the system could be interrogated in a manner similar to that just described wherein a Go Ahead message is directed from the Data Processing Center to the desired Mulcom, through its output section to its input section to initiate transmission of messages.

However, in accordance with the present invention, it is not necessary for the Data Processing Center to follow or be involved in subsequent Go Ahead operations.

It will be recalled that the last character transmitted by Mulcom M1 was a Go Ahead character. This character will travel along the input line 101 in FIG. 1 to the Data Processing Center. Each of the other Mulcoms M2 and M3 is provided with Go Ahead Recognition (GAR) circuitry like that in FIG. 10 for recognizing the presence of the Go Ahead character transmitted by Mulcom M1.

Consequently, the Go Ahead character sent by Mulcom M1 will be directed through the demodulator 108 of Mulcom M2, over the line 105 and into the GAR circuitry 109. About the same time, assuming negligible line delay, the Go Ahead character will pass through the demodulator 110 associated with the input portion of Mulcom M3 over the line 107 and into the GAR circuitry 111.

The Go Ahead character has the following configuration:

| B | A | 8 | 4 | 2 | 1 |
|---|---|---|---|---|---|
| 0 | 0 | 1 | 1 | 1 | 1 |

The Go Ahead character will be received and entered into the Input Shift Register in each of the Mulcoms M2 and M3.

The GAR circuitry 109 for Mulcom M2 and 111 for Mulcom M3 is shown in greater detail in FIG. 10. The presence of the Go Ahead character in the respective Input Shift Registers will result in +S levels on the lines 1006, 1007, 1008 and 1009. When a T6 Special +S level is applied on the line 1010, all inputs of the +AND block 1011 and its Extender 1012 are conditioned.

The output of the +AND 1011 and its Extender 1012 on line 1013 sets the Go Ahead Recognition trigger comprising —TO blocks 1001 and 1002. The +S output of the Go Ahead Recognition trigger is directed on line 1016 to one input of a +AND gate 1017 and on line 1018 to the On input of a Single Shot comprising SS blocks 1019 and 1020. The Single Shot blocks 1019 and 1020 in combination, correspond to the circuit shown in FIG. 14. Upon application of the +S level on line 1018 the Single Shot will begin to time out. During this time interval the output line 1021 of the Single Shot will remain at a —S level.

Each of the lesser remote Mulcoms such as Mulcoms M2 and M3 will have a Single Shot which has a different time out duration depending upon the value of the selected time out capacitor in the circuit of FIG. 14. For illustrative purpose, it will be assumed that the Single Shot in the GAR circuitry of Mulcom M2 has a time out or delay interval of X. If this is the case, then Mulcom M3 would have a time out of $X$+Delta $X$. If a fourth Mulcom were provided on the communication lines, it would have a time out delay of $X$+2Delta $X$. Any other Mulcoms that were connected to the communication lines would have a successively greater amount of time out delay, with the Mulcoms closest to the Data Processing Center having the greatest amount of delay. Sample time out intervals for the factors indicated above might be as follows:

Time X—7 to 8 milliseconds which corresponds to the duration of time required for transmission of one character at 1000 bits per second.

Time Delta X—3 to 4 milliseconds.

The output of the Single Shot at the completion of its time out interval on line 1021 is directed to one input of a Mulcom Active Recognition trigger comprising TV blocks 1022 and 1023. The Mulcom Active Recognition trigger corresponds to that shown in FIG. 15. The output of the Single Shot on line 1021 would come into the terminal 1520 in FIG. 15.

Each of the Input Mulcom Subset Demodulators has carrier detection circuitry for recognizing the presence of carrier on the line 101 in FIG. 1. The —S or +S level on the line 1024 is applied to the TV block 1022 on lines 1025 and 1026 which would be directed into the input terminals 1510 and 1501 of the Single Shot in FIG. 15. This line would ordinarily be at a ground or +S level in the absence of carrier on the line.

If the —S Carrier On line 1024 in FIG. 10 is at a +S level, the +S positive shift on line 1021 from the Single Shot will set the Mulcom Active Recognition trigger and result in a —S level from the TV block 1023 on line 1027. This —S level is applied through the —OR stage 1003, becoming a +S level on the line 1005. This initiates transmission from this Mulcom in a manner similar to that previously described when a —S level is supplied to the —OR stage 1003 on the line 1004 from the Output Mulcom as a result of the Go Ahead message from the Data Processing Center.

Since the Mulcom M2 has the shortest time out delay interval, a +S output from the Single Shot in Mulcom M2 on line 1021 will occur before any other Mulcom has a chance to time out and initiate transmission.

Since this is the case, when the Mulcom M2 Single Shot times out, no carrier will be precent on the line, the line 1024 will be at a ground level and the Mulcom Active Recognition trigger in Mulcom M2 will be set as soon as the Single Shot times out, thereby initiating transmission from the Mulcom M2.

Considering the status of Mulcom M3, no output from its single shot will be applied to its Mulcom Active Recognition trigger until a later time. By the time the Single Shot in Mulcoms M3 times out to supply a +S shift on a line in its GAR circuit which corresponds to the line 1021, a —S level will exist on line corresponding to line 1024 as a result of the Mulcom M2 having started transmission since carrier will then exist on the line 101. The —S level on line 1024 being applied on lines 1025 and 1026 will prevent the setting of the Mulcom Active Recognition trigger in Mulcom M3, even though a positive shift is supplied by the Single Shot. As a result, Mulcom M3 remains inactive.

If other Mulcoms were connected to the lines, the same sequence of events would apply and they, too, would remain inactive as a result of Mulcom M2 having started transmission.

*Go Ahead Message from DPC to Any Mulcom*

Each of the Mulcoms on the line could be provided with circuitry such as that in FIG. 19 for recognizing a Go Ahead message addressed by the DPC to a specific Mulcom. With the provision of this circuitry at each Mulcom, the DPC could address Mulcom M2 for example, rather than Mulcom M1 to initiate a complete scan of the line with the exception of Mulcom M1.

If Mulcom M2 were specifically addressed and had completed transmission of its messages to the DPC, it would initiate a Mulcom to Mulcom Go Ahead message down the line so that the next Mulcom to transmit would be Mulcom M3.

This arrangement might be desirable if certain of the terminals and Mulcoms were expected to be less active during particular times of the day. With the provision of the circuitry of FIG. 19 and the specific addressing provided thereby, a less active Mulcom could be bypassed. An arrangement of this kind would require that the less active Mulcoms be connected closer to the most remote end of the communication line.

It will also be realized that the specific addressing circuitry shown in FIG. 19 can be omitted entirely within the Mulcoms M2 and M3 for example, and that all addressing procedures can be started by the Data Processing Center addressing the most remote Mulcom on the line such as Mulcom M1. Transmission from the other Mulcoms on the line would in that case always be initiated by a Go Ahead message from a more remote Mulcom and would never be initiated by a direct Go Ahead message from the Data Processing Center.

The Go Ahead addressing procedure could also be initiated at Mulcom M1 by the recognition of analog signals, rather than a combination of digital and analog signals as discussed. In this case, a Go Ahead control line, such as the line 1028 in FIG. 10, could be connected directly between the DPC and the Mulcom M1. The DPC would then supply a —S level over the control line to the —OR 1003 to initiate the Go Ahead addressing sequence of all Mulcoms, beginning with M1.

An inherent advantage of the system is the fact that the Go Ahead addressing sequence will continue unbroken even though an intermediate Mulcom becomes inoperative for some reason. It is permissible to intentionally inactivate an intermediate Mulcom such as Mulcom M2 and Mulcom M3 or less remote Mulcoms will still respond to a Go Ahead signal from Mulcom M1 in their regular order. This advantage exists because if Mulcom M2 has not seized the line for transmission of messages to the DPC, the normal time out of the Single Shot in the GAR circuit of Mulcom M3 will result in the activation of Mulcom M3, regardless of the inactivity of Mulcom M2.

*Mulcom to Terminal Set Go Ahead and Terminal Set to Terminal Set Go Ahead*

If desired, the addressing techniques described could be extended to include the terminal equipment, as shown in FIG. 29. In this case, each Mulcom, once it has been activated could address a particular terminal with a Go Ahead message in a manner analogous to the addressing of Mulcom M1 by the DPC. Each terminal would have Go Ahead recognition circuitry similar to that of FIG. 10 and FIG. 19. When the particular addressed terminal such as terminal T1 associated with Mulcom M1 completed transfer of its message, it would generate a Terminal to Terminal Go Ahead message that would be recognized by the other terminals T2 and T3. Timing circuits in Terminals T2 and T3 with preselected delays like those discussed in connection with Mulcoms M2 and M3 would be conditioned by the Go Ahead message from terminal T1. If it is assumed that terminal T2 has a time delay of $X+\text{Delta } X$, and that terminal T3 has a time delay of $X+2\text{Delta } X$, terminal T2 would become activated and seize the input line to Mulcom M1 before terminal T3.

A signal indicative that any terminal is active on the line could readily be provided by circuitry within the knowledge of those skilled in the art to perform the function of the —S Carrier On signal on line 1024 in FIG. 10. For example, the Terminal Set Selected signal on line 618, FIG. 6 could be used for this purpose.

It has been seen that a novel addressing system has been developed wherein stations in a communcation network can be addressed directly by means of digital code permutations in the case of Go Ahead messages supplied from a central processor or exchange or indirectly by analog techniques in the case of Go Ahead messages supplied from multiplexer to multiplexer. In addition, the same addressing system can be applied between the multiplexing equipments and their associated terminals.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A time division multiplex communication system of the type having a message signal transmission carrier means common to all of the stations thereof, comprising:

a central station and a plurality of remote stations, each of said stations including transmitting and receiving facilities, said stations being arranged in an arbitrary sequence for polling purposes;

a plurality of message transmission means, one for each of said remote stations, each settable to a monitor condition or to a transmit condition, alternatively, each operative when set to said transmit condition to cause the transmission of messages from the respectively corresponding one of said stations on said carrier means, each of said message transmission means including means to transmit a go-ahead signal at the end of said message, each of said message transmission means operative when set to said monitor condition to prevent the transmisison of messages from the respectively corresponding station;

a plurality of go-head recognition means, one for each of said remote stations, each including a timing device responsive to said go-ahead messages to issue a delayed go-ahead signal after a predetermined time interval following its initial response to one of said go-ahead messages, said time interval in any one timing device being different from that in any other timing device, said time interval bearing a direct correlation with the position in said polling sequence of the respectively corresponding station, a time interval for one station being lower than that for a station subsequent thereto in said sequence;

and a plurality of start means, one for each of said remote stations, each responsive to a delayed go-ahead signal from the related one of said recognition means and to the absence of a transmission on said carrier means to issue a transmission start signal, said transmission start signal setting the respectively corresponding message transmission means into said transmit condition.

2. The device described in claim 1, additionally comprising:

a plurality of address-responsive receiving means one for each of said stations, each responsive to a different, unique address character to receive messages from said central station over said carrier means;

and a plurality of received go-ahead message recognition means, one for each of said receiving means, each operative in response to a received go-ahead message and a correct, related address, to issue a second start signal, said start means being responsive to said second start signal to issue said transmission start signal without regard to the presence of said delayed go-ahead signal and said transmission on said carrier means.

References Cited by the Examiner

UNITED STATES PATENTS

| | | | |
|---|---|---|---|
| 2,152,010 | 3/1939 | Zenner | 340—167 |
| 2,608,615 | 8/1952 | Oberman | 178—4.1 |
| 2,738,376 | 3/1956 | Vernam et al. | 178—4.1 |
| 2,874,368 | 2/1959 | Sibley | 340—163 |
| 2,912,485 | 11/1959 | Kaufman et al. | 178—4.1 |
| 2,986,723 | 5/1961 | Darwin et al. | 340—147 |
| 3,016,516 | 1/1962 | Doersam | 340—147 |
| 3,046,525 | 7/1962 | Deming et al. | 340—163 |

OTHER REFERENCES

IBM Technical Disclosure "Message Check Character for Serial Transmisison System," vol. 3, No. 9, February 1961, pp. 14–16.

NEIL C. READ, *Primary Examiner.*

H. BOOHER, H. PITTS, *Assistant Examiners.*